(12) United States Patent
Qian et al.

(10) Patent No.: US 10,419,177 B2
(45) Date of Patent: Sep. 17, 2019

(54) SIGNAL TRANSMITTING AND RECEIVING METHODS IN A FILTERING-BASED CARRIER MODULATION SYSTEM AND APPARATUSES THEREOF

(71) Applicant: Samsung Electronics Co., Ltd., Suwon-si (KR)

(72) Inventors: Chen Qian, Beijing (CN); Bin Yu, Beijing (CN); Qi Xiong, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 15/466,747

(22) Filed: Mar. 22, 2017

(65) Prior Publication Data

US 2017/0279579 A1 Sep. 28, 2017

(30) Foreign Application Priority Data

Mar. 22, 2016 (CN) .......................... 2016 1 0166602
Apr. 21, 2016 (CN) .......................... 2016 1 0251781

(51) Int. Cl.
*H04J 3/00* (2006.01)
*H04L 5/00* (2006.01)
(Continued)

(52) U.S. Cl.
CPC ......... *H04L 5/0048* (2013.01); *H04B 7/0452* (2013.01); *H04L 5/0023* (2013.01); *H04W 72/0406* (2013.01)

(58) Field of Classification Search
None
See application file for complete search history.

(56) References Cited

U.S. PATENT DOCUMENTS

2004/0257979 A1 12/2004 Ro et al.
2008/0002645 A1* 1/2008 Seki .................. H04L 25/03834
370/338
(Continued)

OTHER PUBLICATIONS

Huawei et al.; "Remaining Details of Downlink Reference Signal Design"; 3GPP TSG RAN WG1 Meeting #84; R1-160318; St. Julian's, Malta; Feb. 15-19, 2016; 2 pages.
(Continued)

*Primary Examiner* — Kwang B Yao
*Assistant Examiner* — Juvena W Loo

(57) ABSTRACT

A method of signal transmitting in a filtering-based carrier modulation system, includes determining, by a transmitter, a reference signal pattern for each subband of an available frequency band of a system, and transmitting reference signal pattern information to a receiver, inserting, by the transmitter, reference signals on corresponding time-frequency resources according to the reference signal pattern of each subband, performing a carrier modulation and time domain filtering to data signals and the reference signals, and transmitting a processed signal of each subband, wherein the reference signals are used for estimating a frequency domain response of an equivalent channel consisting of a time domain filter and a physical channel from the transmitter to the receiver. The present disclosure also provides a receiving method, a transmitter and a receiver. According to the present disclosure, the storage requirement and detecting complexity of the receiver may be decreased greatly.

20 Claims, 22 Drawing Sheets

(51) Int. Cl.
*H04B 7/0452* (2017.01)
*H04W 72/04* (2009.01)

(56) References Cited

U.S. PATENT DOCUMENTS

| | | | | |
|---|---|---|---|---|
| 2010/0054115 A1* | 3/2010 | Roh | ................... | H04L 27/2634 370/208 |
| 2013/0244676 A1* | 9/2013 | Koivisto | ............... | H04L 5/0048 455/452.1 |
| 2014/0192848 A1* | 7/2014 | Rao | .......................... | H04L 5/00 375/219 |
| 2015/0304146 A1* | 10/2015 | Yang | .................... | H04L 5/0066 370/329 |
| 2015/0372843 A1* | 12/2015 | Bala | .................. | H04L 25/03834 375/295 |
| 2016/0182270 A1* | 6/2016 | Jungnickel | ........ | H04L 25/03828 375/260 |

OTHER PUBLICATIONS

ZTE; "Remaining Issues on NB-RS for NB-IoT"; 3GPP TSG RAN WG1 NB-IoT Ad-Hoc Meeting; R1-161864; Sophia Antipolis, France; Mar. 22-24, 2016; 3 pages.
Samsung; "NB-RS Design"; 3GPP TSG RAN WG1 Meeting #84; R1-160553; St. Julian's, Malta; Feb. 15-19, 2016; 4 pages.
Foreign Communication from Related Counterpart Application; PCT Application No. PCT/KR2017/003056; International Search Report dated Jun. 23, 2017; 3 pages.

\* cited by examiner

SIGNAL TRANSMITTING AND RECEIVING METHODS IN A FILTERING-BASED CARRIER MODULATION SYSTEM AND APPARATUSES THEREOF

CROSS-REFERENCE TO RELATED APPLICATION AND CLAIM OF PRIORITY

The present application is related to and claims the benefit under 35 U.S.C. § 119(a) of a Chinese patent application filed on Mar. 22, 2016 in the Chinese Intellectual Property Office and assigned Serial number 201610166602.3, and of a Chinese patent application filed on Apr. 21, 2016 in the Chinese Intellectual Property Office and assigned Serial number 201610251781.0, the entire disclosures of each of which are hereby incorporated by reference.

TECHNICAL FIELD

The present disclosure relates to radio communication techniques, and more particularly, to signal transmitting and receiving methods in a filtering-based carrier modulation system and apparatuses thereof.

BACKGROUND

With the rapid development of information industry, especially increasing requirements from mobile Internet and Internet of things (IoT), mobile communication techniques are facing unprecedented challenges. According to a report of ITU, ITU-R M.[IMT.BEYOND 2020.TRAFFIC], the mobile traffic volume in 2020 is estimated to be almost 1000 times of that in 2010 (which is in the 4G era), and the number of connected user terminals may exceed 17 billion. The number of connected devices will see more drastic growth when a mass of IoT devices are gradually connected to the mobile communication network. In view of the challenge, the fifth generation mobile communication technology (5G) for the 2020 era is being widely studied by the communication industry and the academia. The ITU report ITU-R M.[IMT.VISION] discusses the framework and overall target of 5G, detailing the prospect of demands for 5G, application scenarios, and key parameters. The ITU report ITU-R M.[IMT.FUTURE TECHNOLOGY TRENDS] provides information regarding future trends of the 5G technology, aiming at remarkably increasing system throughput, providing uniform user experiences, improving extensibility to support IoT, reducing time delay, increasing power efficiency, reducing costs, increasing network flexibility, supporting emerging services, improving flexibility in utilizing the spectrum resources and the like.

Waveforms and multiple access techniques are important basis for air-Interface design, and 5G is no exception. At present, orthogonal frequency division multiplexing (OFDM), acting as a typical multi-carrier modulation (MCM) technique, has been widely used in audio/video broadcasting systems and civil communication systems, e.g., long term evolution (LTE) systems corresponding to evolved universal terrestrial radio access (EUTRA) defined by 3rd generation partnership project (3GPP), digital video broadcasting (DVB) and digital audio broadcasting (DAB) in Europe, very-high-bit-rate digital subscriber loop (VDSL), IEEE802.11a/g wireless local area (WLAN), IEEE802.22 wireless regional area network (WRAN), IEEE802.16 world interoperability for microwave access (WiMAX), and so on. OFDM divides a broad band channel into multiple parallel narrow band subchannels/subcarriers to convert transmission of a high rate data flows in a frequency selective channel into transmission of multiple lower rate data flows in multiple parallel flat subchannels. OFDM can greatly improve the anti-multipath interference capabilities of the system. Furthermore, modulation and de-modulation of OFDM can be simplified using inverse fast Fourier transform/fast Fourier transform (IFFT/FFT). In addition, the use of cyclic prefix (CP) converts the linear convolution of a channel into circular convolution. According to characteristics of circular convolution, when the CP length is larger than the maximum multipath time delay in the channel, inter-symbol interference (ISI) can be eliminated simply by using single tap frequency domain channel equalization. The processing complexity of receivers is remarkably reduced. CP-OFDM can generate waveforms satisfying the demands of 4G mobile broadband (MBB) services, but may have insufficiencies in more challenging 5G scenarios, which mainly include (1), the CP for anti-ISI may significantly decrease the spectrum efficiency in 5G low time delay scenarios. Because low time delay transmission may greatly reduce the length of OFDM symbols while the CP length is determined only by the channel impulse response, the ratio of CP length to OFDM symbol length may become very large. The overhead will result in remarkable loss in spectrum efficiency, and it is unacceptable. (2), strict requirement on time synchronization may cause large signaling overhead which is necessary to maintain close-loop synchronization in 5G IoT scenarios. Further, the strict time synchronization scheme may make frame structures less flexible and cannot satisfy different synchronization demands of different types of services. (3) OFDM uses rectangular pulse, leading to slow sidelobe roll-off, which causes large amount of out-of-band emission. Therefore the OFDM is very sensitive to carrier frequency offset. However, 5G requires much of flexible accessing and sharing of fragmented frequency spectrum, but the large amount of out-of-band emission limits the flexibility of spectrum access. In other words, large amount of frequency domain guard band is required, which reduces the utilization of spectrum. The above insufficiencies are mainly resulted from intrinsic properties of the OFDM. Although proper methods can be adopted to mitigate the impact of the insufficiencies, these methods will increase the system design complexity, and the problems cannot be solved fundamentally.

Therefore, according to an ITU report ITU-R M. [IMT-.FUTURE TECHNOLOGY TRENDS], a few new waveform techniques (based on MCM) are proposed for 5G. Among them, filtering-based OFDM becomes the focused research object. The F-OFDM introduces time domain filtering based on OFDM. By the design of time domain filter, the F-OFDM can reduce the out-of-band emission caused by time domain rectangular window significantly, and keep the specific advantages of OFDM, which includes the orthogonality of subcarrier in complex field, competing the frequency selective fading by adding CP. Effective constraint of out-of-band emission can support fragmented frequency spectrum well. Compared with other new waveform technology, such as filter-bank multi-carrier (FBMC), the F-OFDM keeps the orthogonality of subcarriers in the complex field, and supports the fading channel and multi-antenna system better. The F-OFDM supports subband filtering, i.e., it divides the available frequency band into non-overlapping subbands, and different multi-carrier modulation parameters, including subcarrier spacing, CP length and so on, can be used for different subbands. In order to prevent the inter-subband interferences, a guard band between subbands may be implemented by inserting subcarriers or not inserting subcarriers, different subbands may be allocated to different services or different users. The subband-based filtering improves the spectrum utilization and the flexibility of spectrum utilization.

The F-OFDM is regarded as one of candidate waveform techniques for 5G for these advantages, but it also has some problems. Specifically, in the F-OFDM, both the transmitter and the receiver need to know information about the filter, so as to compensate for the channel distortion caused by filter. However, the design of time domain filter relates to the subband bandwidth, it is necessary to design different time domain filters for different subband bandwidths, which increases the resources required for storage of the time domain filter and the complexity of channel estimation algorithm, and is unfavorable for the application in low complexity devices in IoT or machine type communication (MTC) scenarios.

In view of the above, in order to make the F-OFDM technique more competitive in 5G candidate techniques, besides exploiting its advantages, the disadvantages need to be solved. With respect to many scenarios especially the narrow-band transmission mode under IoT, it is necessary to solve the problems including high storage requirement and high channel estimation complexity caused by the time domain filter in the F-OFDM.

SUMMARY

To address the above-discussed deficiencies, it is a primary object provides signal transmitting and receiving methods for a filtering-based carrier modulation system and corresponding apparatuses, so as to reduce storage requirement and detecting complexity of the receiver.

A signal transmitting method for a filtering-based carrier modulation system, including:

transmitter determining a reference signal pattern for each subband of an available frequency band of a system, and transmitting reference signal pattern information to a receiver;

the transmitter inserting reference signals on corresponding time-frequency resources according to the reference signal pattern of each subband, performing a carrier modulation and time domain filtering to data signals and the reference signals, and transmitting a processed signal of each subband, wherein the reference signals are used for estimating a frequency domain response of an equivalent channel consisting of a time domain filter and a physical channel from the transmitter to the receiver.

In some embodiments, in a frequency domain of the reference signal pattern determined by the transmitter, edge reference signals are inserted discontinuously or continuously on M consecutive subcarriers at the edge of the subband; center reference signals are inserted discontinuously or continuously on subcarriers of the subband except for the M consecutive subcarriers, wherein the M is a natural number determined by a property of a time domain filter of the subband; the number of subcarriers between two adjacent edge reference signals is smaller than a carrier threshold.

In some embodiments, for two adjacent subbands, the edge reference signals are not inserted by a same carrier modulated symbol, and/or, in a time domain of the reference signal pattern, the edge reference signals are carried by discontinuous carrier modulated symbols, and the center reference signals are carried by discontinuous carrier modulated symbols; when the carrier modulation and time domain filtering is performed to the reference signals, the same carrier modulation and time domain filtering as the data signals are performed to the edge reference signals and the center reference signals.

In some embodiments, for adjacent subband 1 and subband 2, the edge reference signals of the subband 1 and the subband 2 are carried by adjacent carrier modulated symbols; for the subband 1, subcarriers adjacent to a guard band carried by a carrier modulated symbol on which the subband 2 transmits the edge reference signals are regarded as guard subcarriers; for the subband 2, subcarriers adjacent to a guard band carried by a carrier modulated symbol on which the subband 1 transmits the edge reference signals are regarded as guard subcarriers, wherein the number of the guard subcarriers is pre-defined according to a property of the time domain filter and/or a subband bandwidth, and/or the number of the guard subcarriers is the same as the number of subcarriers occupied by the edge reference signals.

In some embodiments, if the transmitter is equipped with multiple transmission antennas, the edge reference signals of different data layers are transmitted via orthogonal resources, and the center reference signals of different data layers are transmitted via orthogonal resources, wherein the orthogonal resources includes orthogonal time resources, orthogonal frequency resources and/or orthogonal code sequences; the transmitting the reference signal pattern information includes: transmitting reference signal pattern information corresponding to each data layer, and indicating a relationship between the reference signal pattern information and the data layers;

or, if the transmitter is equipped with multiple transmission antennas, transmitting first edge reference signals and the center reference signals of each data layer periodically; the first edge reference signals of different data layers are transmitted via orthogonal resources, and the center reference signals of different data layers are transmitted via orthogonal resources, among the data layers periodically transmitting first edge reference signals, selecting one data layer to transmit second edge reference signals; the orthogonal resources include orthogonal time resources, orthogonal frequency resources and/or orthogonal code sequences; the transmitting the reference signal pattern information includes: transmitting pattern information of the first edge reference signals and the center reference signals corresponding to each data layer, and indicating a relationship between the pattern information and the data layers.

In some embodiments, in the reference signal pattern, the center reference signals are carried by a first carrier modulated symbol carrying the edge reference signals, wherein the reference signals in the first carrier modulated symbol are used for estimating the frequency domain response of the equivalent channel;

in a second carrier modulated symbol carrying the center reference signals but not the edge reference signals, a plurality of consecutive subcarriers at the edge of the subband are not used for data transmission, and the center reference signals in the second carrier modulated symbol are used for estimating the frequency domain response of the physical channel between the transmitter and the receiver;

in carrier modulated symbols except for the first carrier modulated symbol and the second carrier modulated symbol, demodulation reference signals are carried by non-consecutive subcarriers within the entire subband bandwidth, to estimate the frequency domain response of the equivalent channel of the carrier modulated symbols;

when performing the carrier modulation and time domain filtering to the reference signals, for the second carrier modulated symbol, the carrier modulation is performed and the time domain filtering is not performed; for the other carrier modulated symbols, performing the carrier modulation and time domain filtering;

the number of subcarriers on which no data is transmitted is determined according to the subband bandwidth.

In some embodiments, if the transmitter is equipped with multiple transmission antennas, the first carrier modulated symbol and the second carrier modulated symbol are transmitted on one data layer; on other data layers, no data is transmitted on the same time-frequency resources used for the first carrier modulated symbol and the second carrier modulated symbol; the demodulation reference signals of different data layers are transmitted via orthogonal resources; the orthogonal resources include orthogonal time resources, orthogonal frequency resources and/or orthogonal code sequences;

the transmitting the reference signal pattern information includes: transmitting pattern information of the first carrier modulated symbol and the second carrier modulated symbol, pattern information of the demodulation reference signals corresponding to each data layer, and a relationship between the pattern information of the demodulation reference signals and the data layers.

In some embodiments, the transmitter inserts the first carrier modulated symbol and the second carrier modulated symbol periodically according to the reference signal pattern, and transmits an insertion periodicity of the first carrier modulated symbol and second carrier modulated symbol to the receiver while transmitting the reference signal pattern information;

wherein the insertion periodicity is larger than a predefined threshold.

In some embodiments, the method further includes: in response to receiving an aperiodic reference signal transmission request from the receiver, or in response to determining that a current channel quality is lower than a predefined threshold, the transmitter transmitting aperiodic reference signals to the receiver;

wherein after receiving the aperiodic reference signal transmission request, the transmitter transmits the aperiodic reference signals after a preset time interval; and/or, before transmitting the aperiodic reference signals, the transmitter transmits an indication signal indicating the transmission of aperiodic reference signals.

In some embodiments, the transmitting the reference signal pattern information to the receiver includes:

if a unique reference signal pattern is configured to the corresponding subband bandwidth, transmitting the subband bandwidth as the reference signal pattern information to the receiver; if two or more reference signal patterns are configured to the corresponding subband bandwidth, transmitting the subband bandwidth and index information of the reference signal pattern to the receiver, or, transmitting index information of the reference signal pattern to the receiver as the reference signal pattern information; and/or, transmitting positions of time-frequency resources of the reference signals in the reference signal pattern to the receiver as the reference signal pattern information; and/or, if the edge reference signals of two adjacent subbands are not carried by the same carrier modulated symbol, transmitting the subband bandwidth and a center frequency point of the subband to the receiver as the reference signal pattern information.

A signal receiving method for a filtering-based carrier modulation system, including:

for each subband of an available frequency band of a system, a receiver receiving reference signal pattern information from a transmitter, and determining a reference signal pattern;

the receiver performing a carrier demodulation to a time domain receiving signal of each subband, extracting data signals and reference signals according to the reference signal pattern of each subband, and estimating a frequency domain response of an equivalent channel consisting of a time domain filter and a physical channel from the transmitter to the receiver according to the reference signals;

the receiver detecting the data signals of each subband according to the frequency domain response of the equivalent channel of the subband.

In some embodiments, the receiver determining the reference signal pattern of each subband includes:

if a unique reference signal pattern is configured to a corresponding subband bandwidth, the reference signal pattern information is the subband bandwidth, the receiver determining the reference signal pattern according to the subband bandwidth; if two or more reference signal patterns are configured to the corresponding subband bandwidth, the reference signal pattern information includes the subband bandwidth and index information of the reference signal pattern, and the receiver determining the reference signal pattern among the two or more reference signal patterns corresponding to the subband bandwidth according to the index information of the reference signal pattern; and/or, the reference signal pattern information includes the subband bandwidth and a center frequency point of the subband; the receiver determining the number of subcarriers occupied by edge reference signals according to the subband bandwidth, and determining positions of the edge reference signals according to the subband center frequency point.

A transmitter in filtering-based carrier modulation system, including: a reference signal pattern transmission unit, a reference signal insertion unit and a signal processing and transmission unit; wherein the reference signal pattern transmission unit is configured to determine a reference signal pattern for each subband of an available frequency band of a system, and transmitting reference signal pattern information to a receiver;

the reference signal insertion unit is configured to insert reference signals on corresponding time-frequency resources according to the reference signal pattern of each subband, wherein the reference signals are used for estimating a frequency domain response of an equivalent channel consisting of a time domain filter and a physical channel from the transmitter to the receiver;

the signal processing and transmission unit is configured to perform a carrier modulation and time domain filtering to data signals and the reference signals, and combining and transmitting a processed signal of each subband.

A receiver in filtering-based carrier modulation system, including: a reference signal pattern determination unit, a frequency domain receiving signal extraction unit, an equivalent channel estimation unit and a signal detecting unit; wherein the reference signal pattern determination unit is configured to receive from a transmitter reference signal pattern information corresponding to each subband of an available frequency band in a system, and determine a reference signal pattern;

the frequency domain receiving signal extraction unit is configured to perform a carrier demodulation to a time domain receiving signal of each subband, and extract data signals and reference signals according to the reference signal pattern of each subband;

the equivalent channel estimation unit is configured to estimate a frequency domain response of an equivalent channel consisting of a time domain filter and a physical channel from the transmitter to the receiver according to the reference signals; and the signal detecting unit is configured to detect the data signals of each subband according to the frequency domain response of the equivalent channel of the subband.

It can be seen that in this disclosure, the transmitter determines the reference signal pattern of each subband, and transmits the corresponding information to the receiver. The transmitter inserts the reference signals on the corresponding time-frequency resources according to the pre-defined reference signal pattern, performs carrier modulation and time domain filtering to data signal and the reference signals, and transmits the processed result of each subband. Accordingly, the receiver receives the reference signal pattern information of each subband, determines the corresponding reference signal pattern, performs carrier demodulation to the time domain receiving signal of each subband, extracts the data signals and reference signals according to the reference signal pattern of each subband, and estimates the frequency domain response of the equivalent channel consisting of the time domain filter and physical channel from the transmitter to the receiver, and detects the data signals on the corresponding subband according to the equivalent channel frequency domain response. The method provided by the present disclosure estimates the property of the equivalent channel consisting of time domain filter based on the reference signals. As such, it is possible to realize effective signal detection without the storing the property of the time domain filter of each subband, which greatly reduces the storage requirement and detection complexity of the receiver.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

Figure 1:
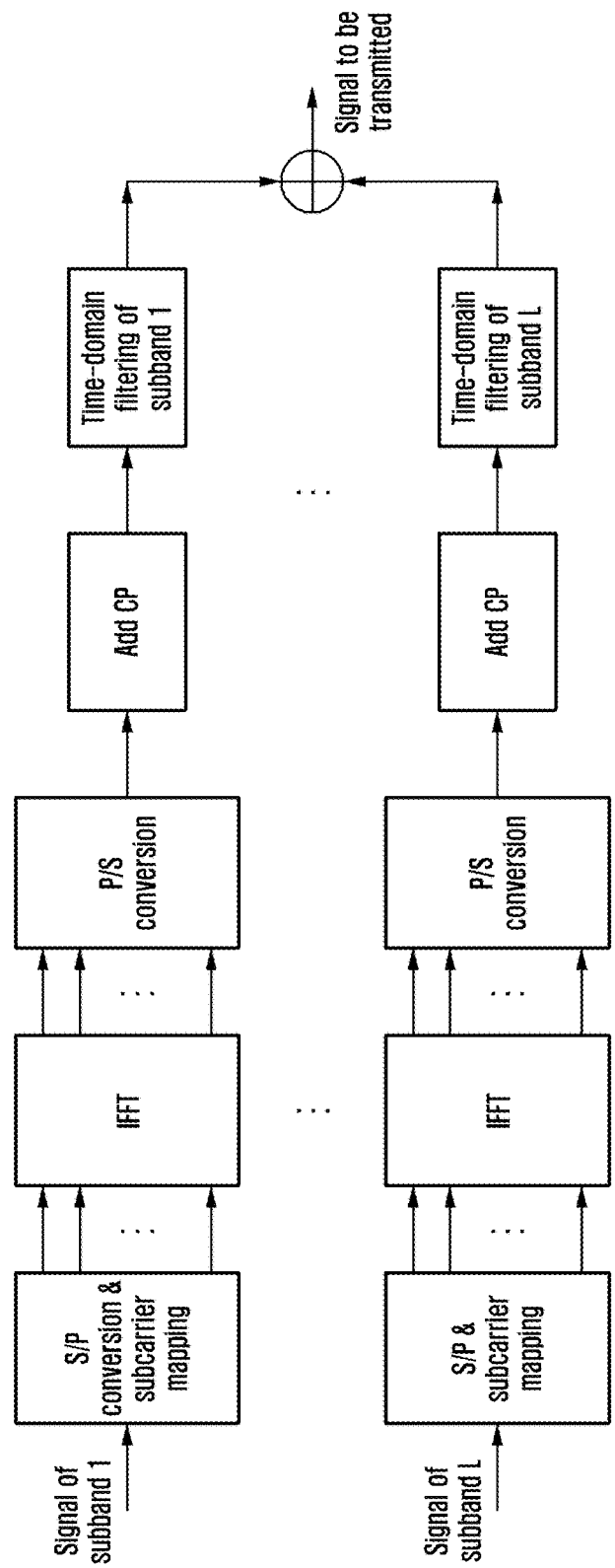
FIG. 1 is a schematic diagram illustrating a transmitter of a filtering-based orthogonal frequency division multiplexing system.

FIG. 1 is a schematic diagram showing a conventional transmitter for filtering-based orthogonal frequency division multiplexing. The available band is divided into L subbands according to service requirements or types of served users. Each subband may use different multi-carrier modulation parameters, such as different subcarrier spacings, different cyclic prefix (CP) lengths, etc. For each subband, the input signal is a complex signal after channel coding and symbol modulation, wherein the symbol modulation includes quadrature amplitude modulation (QAM), or phase shift keying (PSK), etc. After a serial-to-parallel conversion, a subcarrier mapping is performed to the complex input signal of each subband according to the location of subcarriers of the subband. Data is mapped on the allocated subcarriers, and the other subcarriers are filled with zero. Then a time domain signal can be obtained after an N-point inverse fast Fourier transform (IFFT) operation. After the IFFT, a parallel-to-serial conversion is performed to the signal and cyclic prefix (CP) is added to complete a conventional OFDM modulation procedure. In order to reduce inter-subband interferences, each subband is filtered in the time-domain after the OFDM modulation, so as to reduce out-of-band emission. As such, the interferences caused by the difference between carrier modulation parameters of different subbands can be reduced significantly at the expense of relative small guard band.

Several transmitters may exist in the system, and each transmitter may occupy several subbands. To simplify the description, without loss of generality, suppose that each transmitter occupies one subband, and the transmitter is identified by a subband index. The transmitted signal of subband l is expressed by a following formula:

$$s_l(n) = \sum_{t=0}^{T-1} s_{l,t}(n - t \cdot (N + N_{CP}));$$

where t denotes an index of a time domain symbol, N denotes FFT size, $s_{l,t}(n)$ denotes the t-th time domain signal on subband l after the OFDM modulation and is expressed by a following formula:

$$s_{l,t}(n) = \sum_{m=m_1}^{m_1+M_l-1} d_{t,m} e^{j2\pi mn/N}, -N_{CP} \leq n < N;$$

where $N_{CP}$ denotes the CP length, $d_{t,m}$ denotes a data symbol transmitted on the m-th carrier of the t-th subband, the subband l occupies subcarriers $m_1$ to $m_1+M_l-1$. After the filtering in the time domain, the obtained signal may be expressed as follows:

$$\tilde{s}_l(n) = f_l(n) * s_l(n);$$

where $f_l(n)$ denotes a time domain filter for subband l, the * denotes a linear convolution operation.

Figure 2:
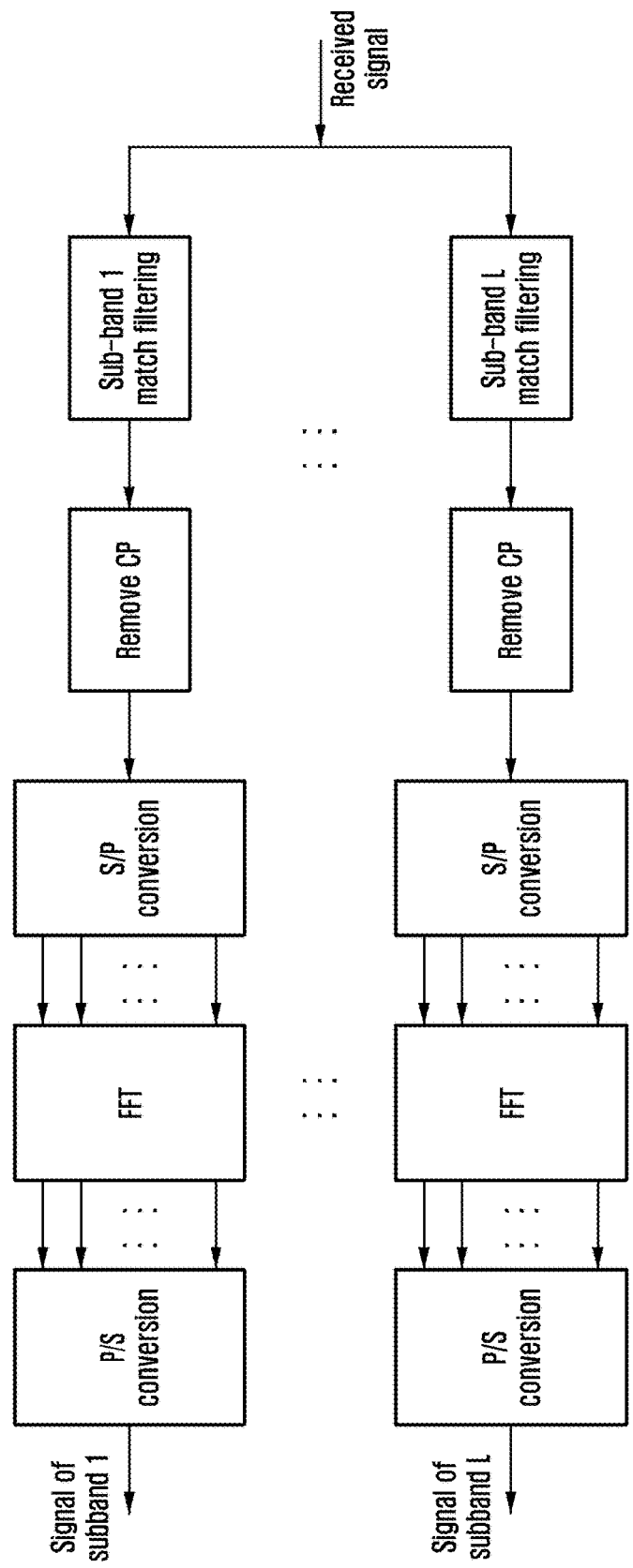
FIG. 2 is a schematic diagram illustrating a receiver of a filtering-based orthogonal frequency division multiplexing system.

FIG. 2 is a schematic diagram showing a receiver in conventional F-OFDM system. The receiver performs a subband level matched filtering to the receiving signal firstly, then performs an OFDM demodulation as shown in FIG. 2 to the signal of each subband (including removing CP, serial-to-parallel conversion, discrete Fourier transform and parallel-to-serial conversion), and obtains an estimation of the transmission signal of each subband. Suppose a time domain impulse response of the filter of the l-th subband is $f_l(n)$, the time domain impulse response of the corresponding matched filter is $f^*_l(-n)$, where symbol * denotes an operation of obtaining a conjugate.

After the subband matched filtering, the time domain receiving signal of subband l is expressed as follows:

$$r_l(n) = f^*_l(-n) * h_l(n) * \tilde{s}_l(n) = f^*_l(-n) * h_l(n) * f_l(n) * s_l(n).$$

In the above formula, it is assumed that signals of other subbands can be separated by subband filtering and the following frequency domain processing. In the above formula, a frequency domain response of an equivalent channel $f^*_l(-n) * h_l(n) * f_l(n)$ including the subband filtering and the subband matched filtering needs to be estimated, so as to proceed with the following data demodulation, where $h_l(n)$ denotes the channel impulse response, the symbol * denotes the linear convolution, and the superscript * denotes the complex conjugation operation.

The time domain filter can be designed by a sinc filter soft-truncated with a window function. For example, if a sinc function is soft-truncated with a Hann window, the time domain impulse response and corresponding frequency domain response of the filter are as shown in FIG. 3.

Figure 3:
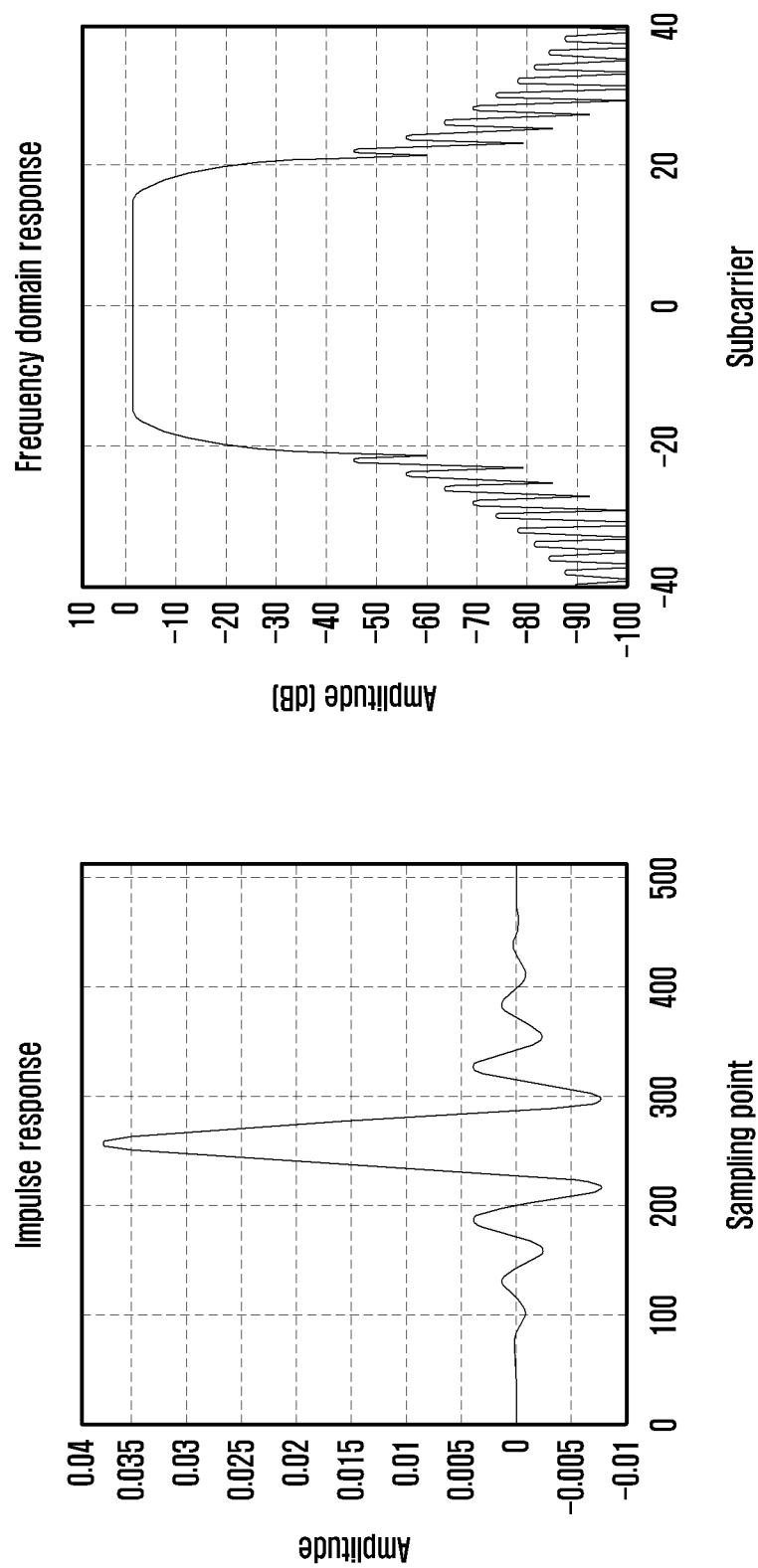
FIG. 3 is a schematic diagram illustrating a time domain impulse response and a frequency domain response of a window function utilized by the filtering-based OFDM.

It can be seen from the right figure of FIG. 3 that, the window function used in F-OFDM has a flat passband, a low amplitude stopband, and a short transition band between the passband and the stopband, which makes the out-of-band emission much smaller than that of OFDM system. Therefore, the subband level filtering is feasible, and different multicarrier parameters including subcarrier spacings or CP lengths can be used for different subbands. The left figure of FIG. 3 shows the time domain impulse response of the used window function, which is expressed by h(n), where n denotes the number of sampling points. It can be seen that in order to reduce the inter-subband interference caused by the out-of-band emission, a time domain filter with a long tail needs to be adopted for the F-OFDM. The length of filter provided by the prior art is longer than the CP length, even reach a half of the length of OFDM symbol. In addition, in order to control the out-of-band emission better, different time domain filters need to be adopted for subbands with different bandwidths.

Figure 4:
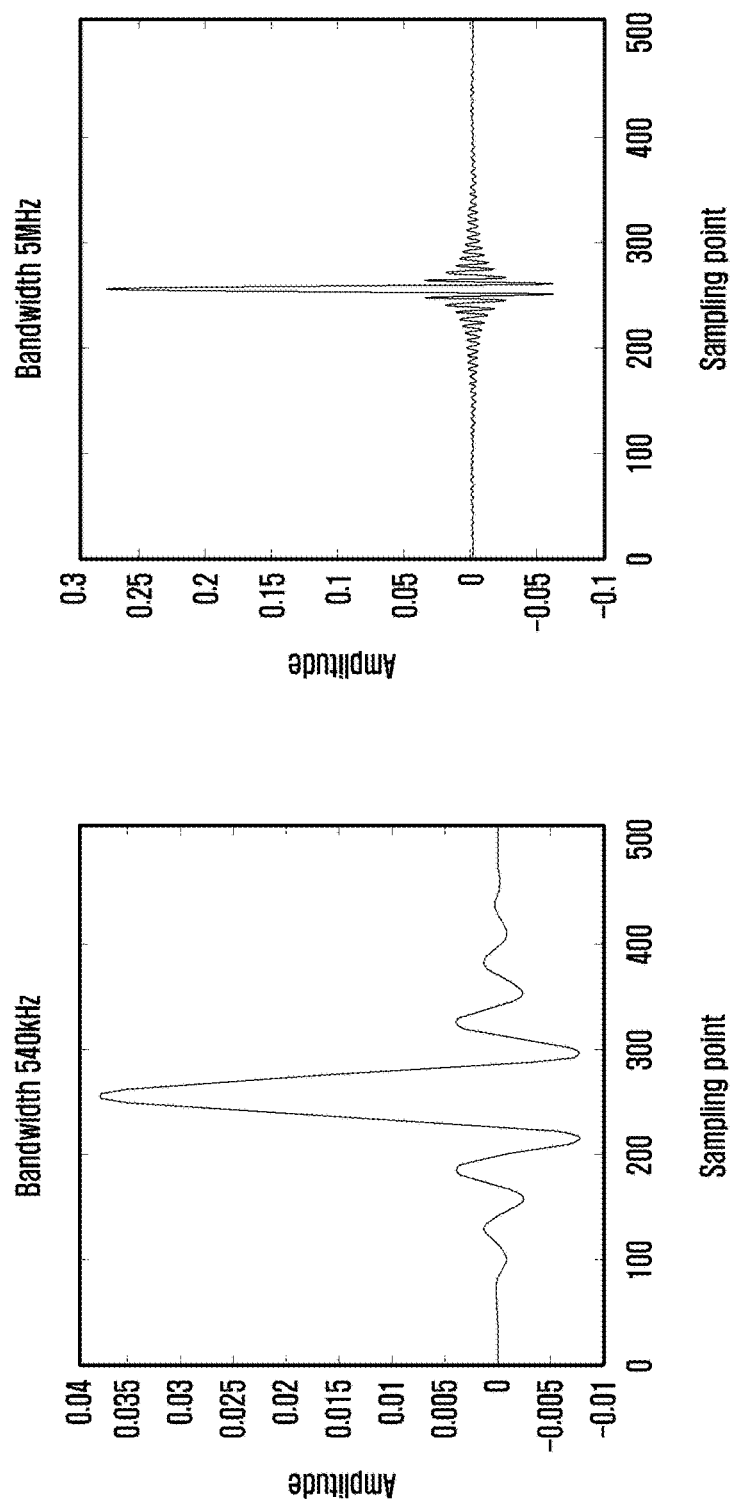
FIG. 4 is a schematic diagram illustrating impulse responses of time domain filters for different subband bandwidths.

FIG. 4 is a schematic diagram illustrating impulse responses respectively for time domain filters of bandwidths 540 kHz and 5 MHz according to some embodiments of the present disclosure. It can be seen that for subbands with different bandwidths, the time domain filters are quite different. Because the F-OFDM system does not reserve null-subcarriers to reduce the impact caused by the jitter of frequency domain response of the filter at the edge of subband, the receiver needs to know the parameters of time domain filter in order to compensate the frequency domain response distortion at the edge of the subband caused by the filtering. In order to support different subband bandwidths, both the transmitter and receiver need to acquire the impulse response functions of the filter under various subband bandwidths, which is unfavorable for the development of low complexity receiver. The above shows the problem caused by the introduction of time domain filtering in the F-OFDM system. In fact, the same problem also exists in other filtering-based carrier modulation systems, such as single carrier frequency division multiple access (SC-FDMA), universal-filtered multi-carrier (UFMC), and the like.

Figure 5:
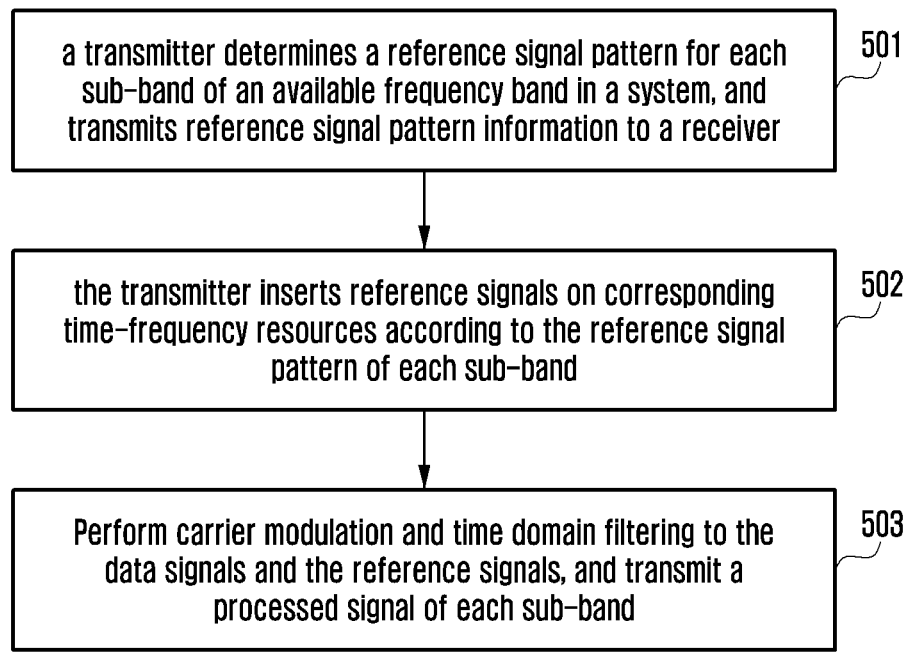
FIG. 5 is a flowchart illustrating a signal transmitting method in a filtering-based carrier modulation system according to some embodiments of the present disclosure.

In order to solve this problem, embodiments of the present disclosure provide a signal transmitting and receiving method in a filtering-based carrier modulation system. FIG. 5 is a flowchart showing a basic transmission method including the following.

In step 501, a transmitter determines a reference signal pattern for each subband of an available frequency band in the system, and transmits reference signal pattern information to a receiver.

In step 502, the transmitter inserts reference signals on corresponding time-frequency resources according to the reference signal pattern of each subband.

The reference signals are used for estimating a frequency domain response of an equivalent channel consisting of a time domain filter and a physical channel from the transmitter to the receiver.

In step 503, carrier modulation and time domain filtering are performed for data signals and reference signals, and a processed signal of each subband is transmitted.

The resulted signal of the subband is transmitted according to a conventional method, i.e., the resulted signal is transmitted to the receiver directly if the available bandwidth includes one subband, and if the available bandwidth includes a plurality of subbands, the resulted signals of various subbands are combined before being transmitted.

Figure 6:
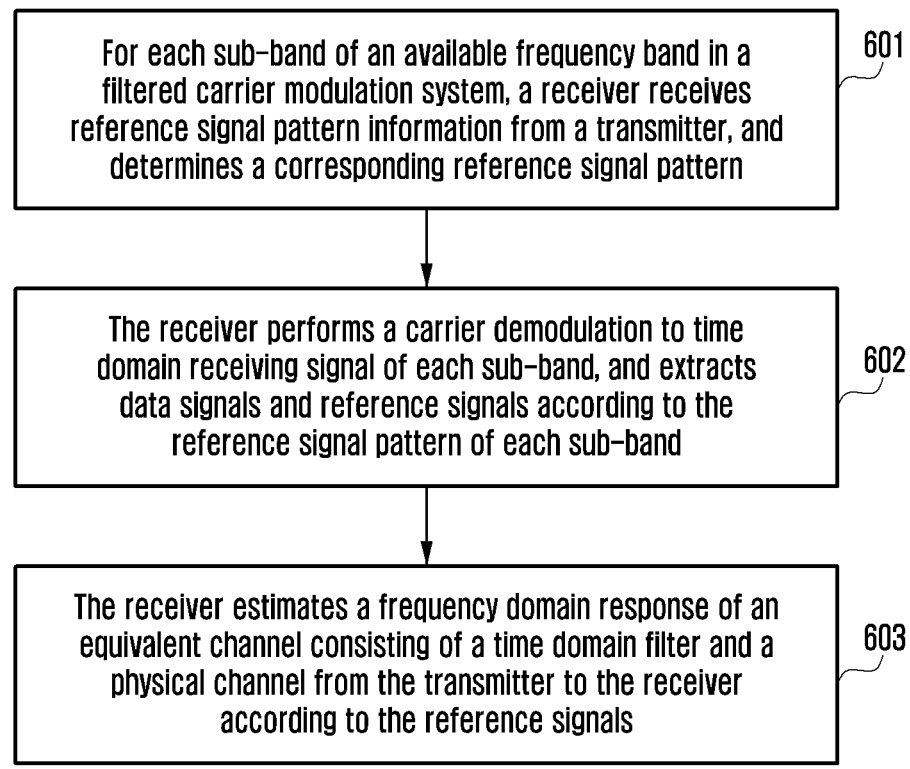
FIG. 6 is a flowchart illustrating a signal receiving method in the filtering-based carrier modulation system according to some embodiments of the present disclosure.

In accordance with the above transmitting method, a basic procedure of a receiving method is shown in FIG. 6 includes the followings.

In step 601: for each subband of the available frequency band in a carrier modulation system, a receiver receives information of a reference signal pattern from a transmitter, and determines the corresponding reference signal pattern.

In step 602: the receiver performs a carrier demodulation to the time domain receiving signal of each subband, and extracts data signals and reference signals according to the reference signal pattern of each subband.

In step 603, the receiver estimates a frequency domain response of an equivalent channel consisting of a time domain filter and a physical channel from the transmitter to the receiver according to the reference signals.

In step 604, the receiver performs data signal detection on each subband in accordance with the frequency domain response of the equivalent channel of the subband.

In the above transmitting and receiving methods, in order to facilitate the receiver to estimate the equivalent channel consisting of the time domain filter and the physical channel, in some embodiments, the reference signals are divided into two kinds, one is edge reference signal and the other is center reference signal. The edge reference signal is used for estimating the frequency domain response of the equivalent channel on subcarriers in the transition band where the frequency domain response of the time domain filter varies significantly (referred to as a roll-off region hereinafter). The edge reference signal can be distributed on non-consecutive or consecutive subcarriers in the roll-off region. The frequency domain responses on different frequencies in the roll-off region may vary a lot. Therefore, in order to guarantee the accuracy of channel estimation in the roll-off region, the number of subcarriers between any two adjacent edge reference signals in the roll-off region is smaller than a predefined carrier threshold. In some embodiments, the edge reference signal occupies $N_e$ consecutive subcarriers. The other kind is the center reference signal, for estimating the frequency domain response of the equivalent channel of the passband where frequency domain response of the time domain filter varies slowly. The center reference signal is transmitted on non-consecutive or consecutive subcarriers.

Figure 7:
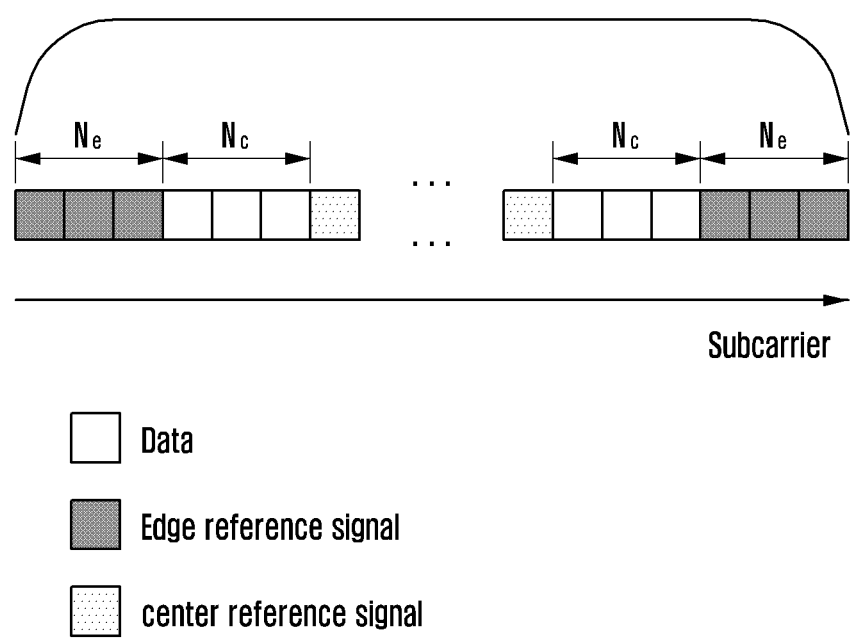
FIG. 7 is a schematic diagram illustrating configuration parameters of reference signals according to some embodiments of the present disclosure.

In order to reduce the overhead of reference signal, in some embodiments, the center reference signal is inserted every $N_c$ subcarriers. FIG. 7 is the schematic diagram illustrating $N_e$ and $N_c$ according to some embodiments of the present disclosure.

In FIG. 7, both $N_e$ and $N_c$ are 3, which denotes that three consecutive subcarriers at the edge of the subband are used for the transmission of the edge reference signal, and the center reference signal is inserted every three subcarriers in the remaining frequency band of the subband. It should be noted that, FIG. 7 shows an exemplary reference signal insertion manner for a carrier modulated symbol, on which the edge reference signal and center reference signal are inserted in the same carrier modulated symbol. In order to enhance the spectrum utilization, in some embodiments, the reference signal can be transmitted on only preset multi-carrier modulated symbols, as shown in FIG. 7. In other multi-carrier modulated symbols, no reference signal or only the discontinuous center reference signals are transmitted. Certainly, the edge reference signal and center reference signal can be inserted in different carrier modulated symbols. The insertions of these two signals are independent to each other.

As to configuration parameters for the reference signals, the number of subcarriers $N_e$ occupied by the edge reference signal is determined by the property of the time domain filter of the subband. The property of the time domain filter includes the roll-off rate at the edge of subband of the frequency domain response of the time domain filter. The $N_e$ is determined by the transmitter according to the roll-off rate. $N_c$ can be pre-set by the transmitter, or set according to a varying rate of the channel. In some embodiments, the faster the channel varies, the smaller the $N_c$ is; the more slowly the channel varies, the bigger the $N_c$ is.

According to the method provided by the embodiments of the present disclosure, the receiver does not need to acquire the information of the time domain filter used by the transmitter, and does not need to perform the matched filtering when processing the receiving signal, which dramatically decreases storage requirement and detection complexity. Furthermore, through the edge reference signal born by the consecutive subcarriers at the edge of the subband, the frequency domain response of the equivalent channel in the roll-off region can be estimated accurately, and the signal detection performance may be improved.

As described above, the performance of signal detection depends on the performance of the equivalent channel estimation. Therefore, a well-designed reference signal pattern is necessary for accurately estimating the frequency domain equivalent channel coefficients at each frequency point in the subband. embodiments of the present disclosure are given to show several reference signal patterns and the corresponding signal transmission and receiving processes based on such patterns.

Embodiment 1

In this embodiment, signal transmitting and receiving methods in a filtering-based carrier modulation system are described with reference to a specific system configuration. F-OFDM system is taken as an example herein. There may be one or more transmitters in the system, and each transmitter transmits on one or more subbands. Without loss of generality, suppose that each transmitter occupies one subband, and is identified by a subband index. It should be noted that the description and analysis of this embodiment are also applicable for a situation that each transmitter occupies several subbands. Suppose that the frequency band of system is divided into L subbands. The transmitter of subband 1 is shown as FIG. 8.

Figure 8:
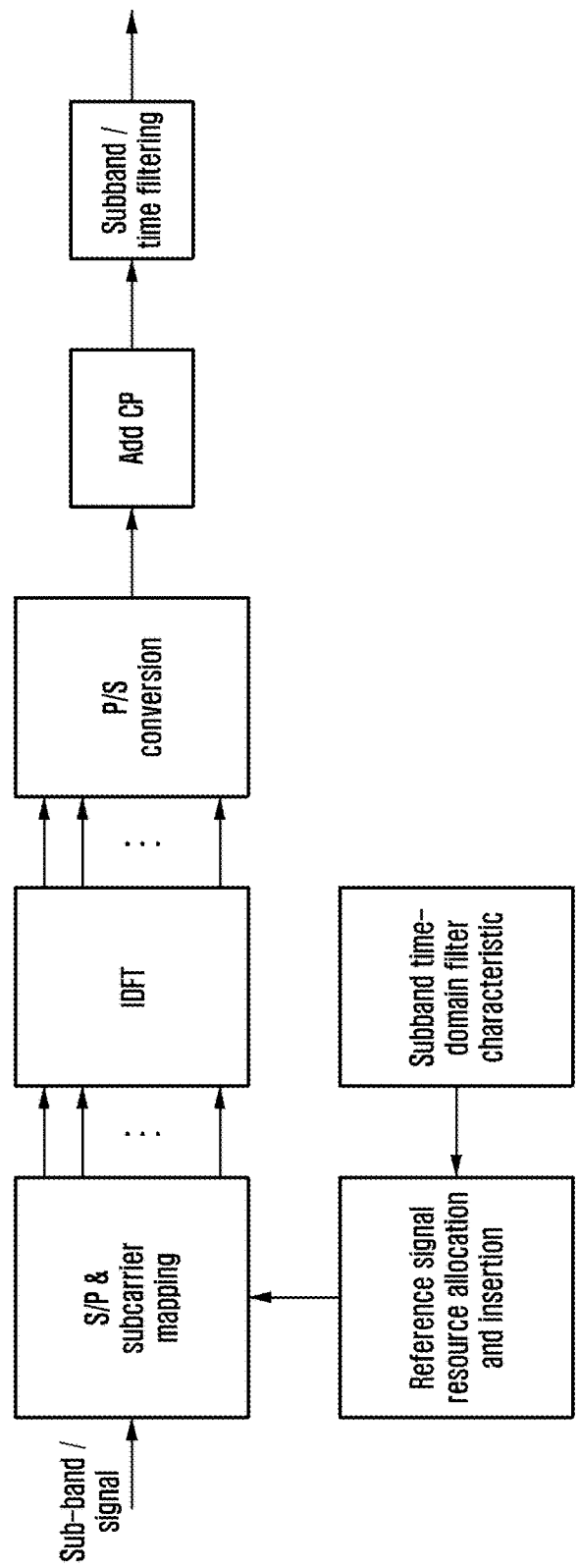
FIG. 8 is a schematic diagram illustrating a transmitter of subband 1 according to some embodiments of the present disclosure.
Figure 9:
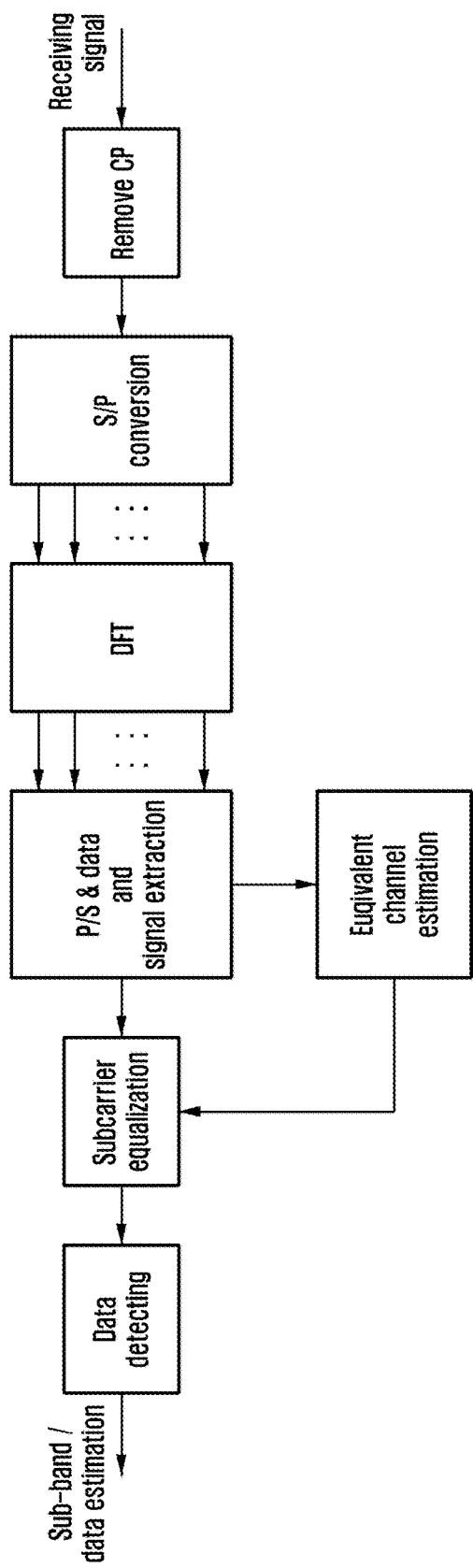
FIG. 9 is a schematic diagram illustrating a receiver of subband 1 according to some embodiments of the present disclosure.

In FIG. 8, the resource allocation for the reference signals is determined according to the property of time domain filter of the subband, and the reference signals are inserted on the corresponding subcarriers during the resource allocation and subcarrier mapping of the data. Therefore, the reference signals pass through the same time domain filter and physical channel with the data, thus can be used for estimating equivalent channel state information.

After the data is received, parameters such as CP length and subcarrier spacing are determined according to the carrier modulation parameters of subband 1, the CP is removed based on the parameters, and the carrier demodulation is performed. According to resource allocation of the reference signals and the resource allocation of the data of subband 1, the frequency domain receiving signals of the data and the reference signals are extracted. According to the known reference signals, the receiver estimates the equivalent channel state information of the subband, and applies it to single tap equalization of each subcarrier. After the equalization operation, the transmission data detection is performed, and an estimation of the data of subband 1 may be obtained.

Assume the time domain signal of the transmission data of subband 1 after multi-carrier modulation is $s_l(n)$, wherein n is the number of sampling point. The signal after the time domain filtering of subband 1 may be expressed by $f_l(n)*s_l(n)$, wherein $f_l(n)$ denotes an impulse response function of the time domain filter of subband 1. After passing the physical channel between the transmitter and the receiver, the receiving signal of subband 1 may be expressed as:

$$r_l(n)=h_l(n)*f_l(n)*s_l(n)+N(n);$$

wherein $h_l(n)$ denotes an impulse response of the time domain channel between the transmitter and the receiver of subband I; N(n) denotes noises. Therefore, in order to estimate the data transmitted on subband I, the equivalent channel $h_l(n)*f_l(n)$ consisting of the time domain filtering and physical channel needs to be obtained. In the frequency domain, an equivalent channel coefficient $H_l(m)F_l(m)$ of subcarrier m needs to be determined, wherein $H_l(m)$ denotes a frequency domain channel coefficient of subcarrier m, which is obtained by performing a Fourier transform to the time domain channel impulse response. $F_l(m)$ denotes a coefficient of a frequency-domain response of the time-domain filter of subcarrier m, which is obtained by performing the Fourier transform to the impulse response of the time-domain filter. The frequency domain equivalent channel coefficient of subcarrier m is a product of these two factors.

Figure 10:
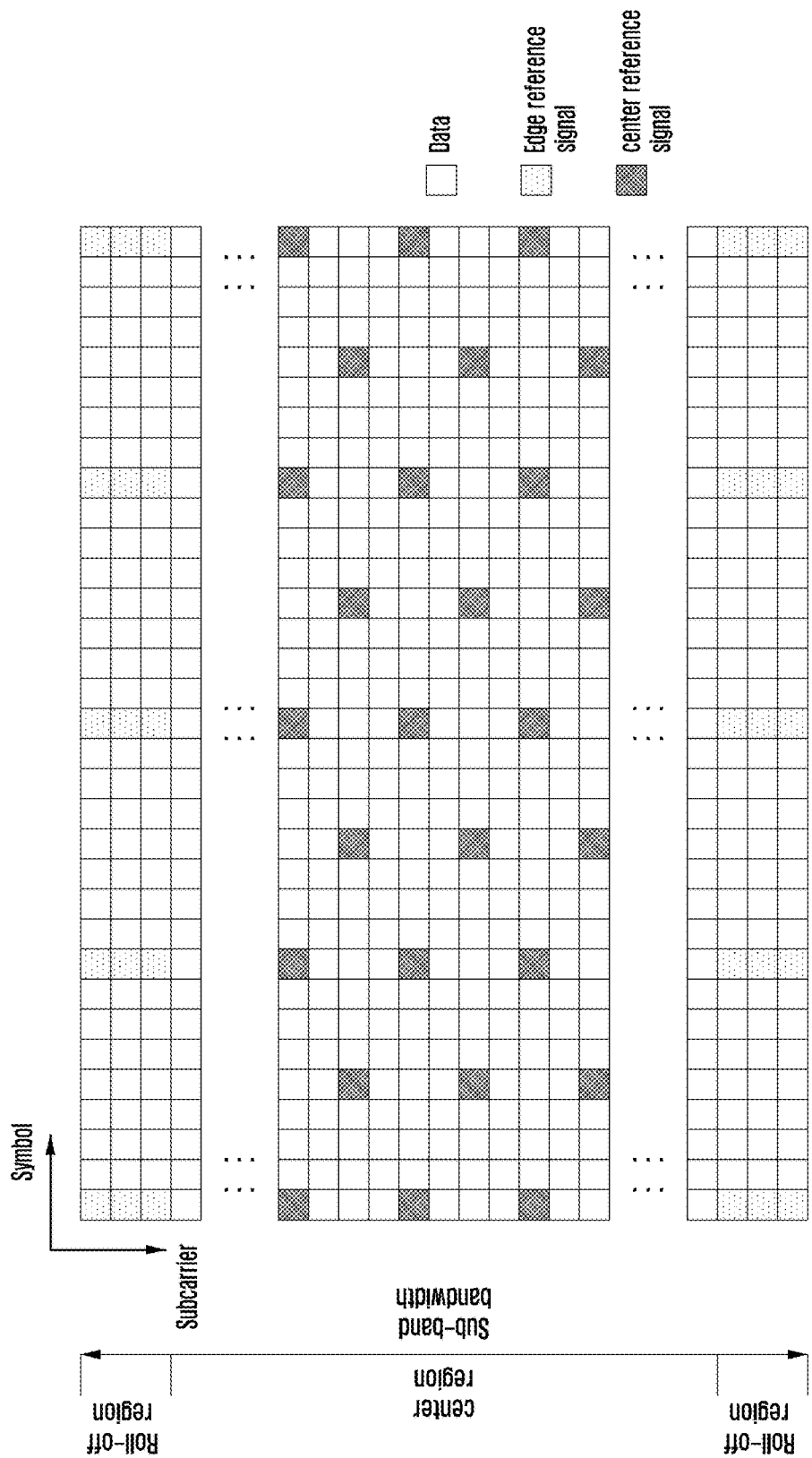
FIG. 10 is a schematic diagram illustrating reference signal resource allocation according to some embodiments of the present disclosure.

In the frequency domain response of the time-domain filter as shown in FIG. 3, although a large part of the frequency domain response is flat, variation areas still exist at the edge of subband. If the reference signals are inserted according to a conventional method, e.g., a method of equally spaced distributed reference signal insertion similar as UE-specific reference signal, it may lead to inaccurate channel estimation on the subcarriers at the edge of subband, which affects the performance of data detection. To solve such problem, embodiments of the present disclosure provide a method of allocating resources for the reference signals based on the properties of the frequency domain response of the time-domain filter of the subband. Considering that the frequency domain response of the filter of the subband is flat in the center region, and distortion always exists at the edge of subband due to the filter roll-off, intensive reference signals may be inserted at the edge of subband, and sparse reference signals may be inserted in the center region of subband. FIG. 10 shows a possible method for inserting the reference signals, i.e. the reference signal pattern.

In FIG. 10, the subband bandwidth is divided into two parts according to the property of the frequency domain response of the time domain filter of the subband. One part is the center region, which is corresponding to the passband where the frequency domain response of the filter is relatively flat. The other part is the roll-off region, corresponding to the transition band where the frequency domain response of the filter varies significantly in the subband. According to the frequency domain response shown in FIG. 3, the properties of these two regions are different. In order to obtain an accurate estimation on the whole band and reduce the overhead of reference signals, in some embodiments, different reference signal inserting methods are adopted for these two regions. Specifically, in the center region, the frequency domain response of the filter rarely varies, therefore sparse distributed reference signals may be inserted for the estimation of equivalent frequency domain channel $H_l(m)F_l(m)$, such reference signals are referred to as center reference signals. In the roll-off region, the frequency domain response of the filter may vary. In order to guarantee the accuracy of estimation of the equivalent channel, the reference signals are inserted on the consecutive subcarriers, such reference signals are referred to as edge reference signals, as shown in FIG. 10. Meanwhile, the above two kinds of reference signals are both distributed discretely in time domain, so as to reduce the overhead of reference signal. The distribution of these two kinds of reference signals in time domain may be the different (as shown in FIG. 10), or may be same. The receiver estimates the frequency domain equivalent channel coefficient of the corresponding subcarriers at edge of the subband according to the edge reference signals, interpolates in the time domain, and obtains the frequency domain equivalent channel of the whole roll-off region. The receiver also estimates the frequency domain equivalent channel coefficients of the corresponding subcarriers according to the center reference signals, interpolates in the time and frequency domain, and obtains the frequency domain equivalent channel of the center region. Combining the above, equivalent channel state information of the whole subband may be obtained, which may be used for the demodulation and estimation of the data.

More specifically, at the receiver, the estimation of frequency domain response of the equivalent channel includes: among the reference signals, estimating the frequency domain response of the equivalent channel of the M consecutive subcarriers at the edge of the subband according to the edge reference signals, interpolating in the time domain, and obtaining the frequency domain response of the equivalent channel on the M consecutive subcarriers; estimating the frequency domain coefficient of the equivalent channel on the subcarriers where the center reference signals are located according to the center reference signals, interpolating in the time frequency domain, and obtaining the frequency domain response of the equivalent channel on the subcarriers except for the subcarriers where edge reference signals are inserted.

It should be noted that, the reference signal pattern of the center region may use distributed reference signals as shown in FIG. 10, or continuous reference signals, i.e. inserting the reference signal on consecutive subcarriers.

The bandwidth of roll-off region, i.e. the number of subcarriers at the edge of the subband where the edge reference signals are inserted, is determined by the property of the frequency domain response of the time domain filter used by the transmitter. The roll-off coefficient of the filter may be defined as:

$$\alpha = \frac{W_{all} - W_C}{W_{all}};$$

wherein $W_{all}$ denotes the available subband bandwidth, $W_C$ denotes the bandwidth of the center region. That is, the roll-off coefficient α is defined as the ratio of the bandwidth of the roll-off region and the whole available subband bandwidth. The number of subcarriers at the edge of subband where the edge reference signals are inserted is determined according to the roll-off coefficient α and the subband bandwidth. The center reference signal pattern can be designed according to a maximum delay spread and a maximum Doppler frequency shift supported by the transmitter. For further details, reference may be made to cell-specific reference signal (CRS) or CSI-RS design in the LTE/LTE-A.

Meanwhile, as described above, the edge reference signals in the subband edge area can be also in a distributed manner. In this situation, the edge reference signals is inserted in the distributed manner in frequency resources of the M consecutive subcarriers at the edge of the subband. The number of subcarriers between two adjacent edge reference signals is smaller than a predefined carrier threshold. The center reference signals is inserted discretely or continuously in the frequency resources except for the M subcarriers at the edge of the subband. The value of M can be determined according to the frequency domain response property of the time domain filter of the subband, similarly as described above.

After determining the reference signal pattern, the transmitter transmits the reference signal pattern to the receiver via a broadcast channel or a control channel. One possible method includes: configuring one reference signal pattern corresponding to the subband bandwidth, which is known for the transmitter and receiver. At this time, the transmitter just needs to notify the receiver of the subband bandwidth. The receiver is able to obtain the reference signal pattern according to the subband bandwidth, and perform equivalent channel estimation and data demodulation according to the reference signal pattern. If the transmitter uses different time domain filters for subbands of the same bandwidth, there may be several reference signal patterns corresponding to the same subband bandwidth. In this case, besides the subband bandwidth, the specific reference signal pattern also needs to be provided to the receiver. An index manner may be used to inform the receiver of the specific reference pattern, one example is as shown in Table 1.

TABLE 1

One possible informing method of reference signal pattern

| Bandwidth of subband | Type of filter | Reference signal pattern |
|---|---|---|
| 540 kHz | 0 | 0 |
|  | 1 | 1 |
| 1.4 MHz | 0 | 2 |
|  | 1 | 3 |
| 5 MHz | 0 | 4 |
|  | 1 | 5 |

In the above example, the transmitter informs the receiver of the subband bandwidth by means of an index, and informs the receiver of the type of filter by means of an index at the same time. In the above table, there are three types of available subband bandwidth, and 2 bits may be used to inform the receiver of the subband bandwidth. For each subband bandwidth, there are two types of filters and 1 bit may be used to inform the receiver of the filter type. The receiver obtains the reference signal pattern by searching the table according to these two pieces of information. Alternatively, the specific reference signal pattern may be denoted by a 3-bit index directly.

Another reference signal pattern informing method is direct informing, i.e. informing receiver of the time frequency resources allocated for the reference signals, e.g., informing the receiver of the number of subcarriers where the edge reference signals are continuously inserted and time domain inserting frequency by means of an index.

Embodiment 2

In this embodiment, a reference signal transmitting method in a filtering-based carrier modulation system is described with reference to specific system configurations. The F-OFDM system still is taken as an example herein. There may be one or more transmitters in the system, and each transmitter transmits on one or more subbands. Without loss of generality, suppose that each transmitter occupies one subband, and is identified by a subband index. It should be noted that the description and analysis of this embodiment can also be applicable for the situation that each transmitter occupies several subbands.

Figure 11:
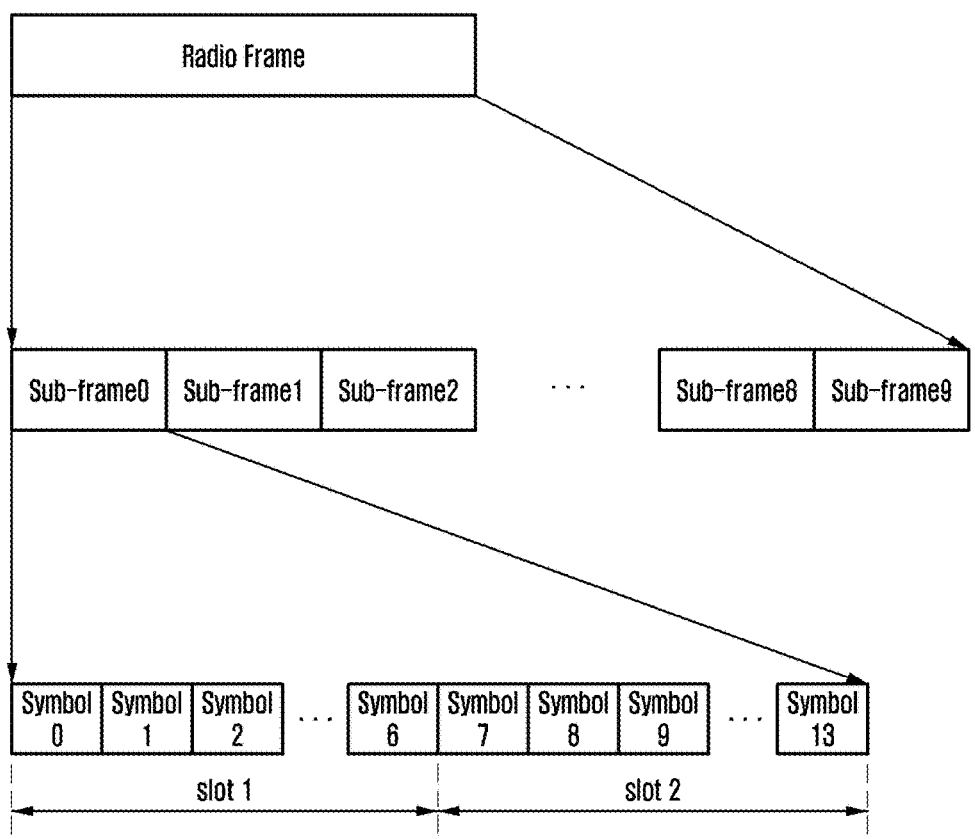
FIG. 11 is a schematic diagram illustrating a structure of a radio frame according to some embodiments of the present disclosure.

In this embodiment, a radio frame structure shown in FIG. 11 is taken as an example. The system performs resource scheduling and provides service in physical resource blocks (PRBs), and each PRB consists of 12 subcarriers of 7 F-OFDM symbols. In the time domain, one possible frame structure is that, each slot consists of 7 F-OFDM symbols, each sub-frame includes 2 slots, and each radio frame includes 10 sub-frames.

In this embodiment, the designed reference signal pattern includes three types of reference signals. In the frequency domain, the first kind is edge reference signals, located on multiple consecutive subcarriers at the edge of subband. The second kind is the center reference signals, located on non-consecutive or consecutive subcarriers in the middle of subband. The third kind is demodulation reference signals, discretely located in the entire bandwidth of subband. The relationship of locations of these three kinds of signals in the time domain includes the following.

1. The edge reference signals and part center reference signals are located in the same OFDM symbol, this kind of OFDM symbol is referred to as a first filter symbol, which is used for estimating the equivalent channel of the whole bandwidth of the subband including the roll-off region. Due to the existence of the edge reference signals, the result of equivalent channel estimation includes the channel distortion of the roll-off region.

2. The OFDM symbols where the center reference signals except for those mentioned in 1 are located are referred to as second filter symbols. For these symbols, filtering based on time domain filter is not performed. Therefore, the frequency domain response of the physical channel from the transmitter to the receiver may be estimated based on the reference signals in these OFDM symbols. However, since the time domain filtering which may restrict the inter-subband interference is not performed, a frequency band at the edge of the subband of the second filter symbol is reserved as a guard band. No data is transmitted on the guard band, so as to avoid the interference to adjacent subbands. The subband except for the guard band may be used for the transmission of data and reference signals.

3. The demodulation reference signals are discretely located in the whole bandwidth of the subband of the OFDM symbols except for the first and second filter symbols. The demodulation reference signals may be conventional reference signals or newly defined reference signals. The demodulation reference signals may be used for estimating the equivalent channel frequency domain response of the OFDM symbols except for the first and second filter symbols.

The first and second filter symbols are used for estimating the frequency domain response of the time domain filter, and are referred to as filter symbols in general. Specifically, according to the first filter symbol, the equivalent channel frequency domain response $H_f(m)F_f(m)$ can be estimated, according to the second filter symbol, the physical channel frequency domain response $H_f(m)$ may be estimated. If the first filter symbol and second filter symbol pass through approximately the same physical channel, the frequency domain response of the time domain filter can be estimated. In order to guarantee the physical channel experienced by the first filter symbol and second filter symbol are approximately the same, in some embodiments, the distance between the first filter symbol and the second filter symbol is smaller than a distance threshold. For example, the first filter symbol is adjacent to the second filter symbol. Furthermore, the estimated frequency domain response of the time domain filter may be used to correct the equivalent channel estimated by the demodulation reference signal. Meanwhile, considering that the time domain filter is stable, and no frequent estimation is required, the first filter symbol and second filter symbol may appear with a long periodicity when they are inserted periodically. For example, the periodicity may be larger than a predefined threshold. An example of the reference signal pattern is shown below.

The first symbol (symbol 0) of sub-frame 0 in each radio frame is used as the first filter symbol. For this symbol, no time-domain filtering is applied, and only the subcarriers in the middle of the subband are used for transmitting data and reference signals. The reference signals in the symbol are used for estimating the frequency domain response of the physical channel $H_f(m)$. Part of bands is reserved as a guard band on respective side of the subband of the symbol to avoid interference to adjacent subbands. For remaining symbols of each radio frame, the F-OFDM transmission method based on time domain filter is adopted. The transmitter is as shown in FIG. 8. The symbol (symbol 1) adjacent to symbol 0, i.e. the second symbol of sub-frame 0 of each radio frame, is used as the second filter symbol. In this symbol, the reference signals are inserted on several consecutive subcarriers at the edge of subband, for estimating the frequency domain response $H_f(m)F_f(m)$ of the equivalent channel consisting of the time domain filter and the physical channel, and estimating the distortion of the frequency domain response of the equivalent channel at the edge of the subband brought out by the time domain filter. Through the equivalent channel estimation of symbol 0 and symbol 1, the frequency domain response function $F_f(m)$ of the time domain filter may be obtained. Therefore, in the other symbols of radio frame, it merely needs to insert the demodulation reference signals discretely to estimate the equivalent channel $H_f(m)F_f(m)$ of passband of the subband. The equivalent channel estimation of the whole band may be obtained by means of interpolation. Through correcting the frequency domain response at the edge of subband with $F_f(m)$, a relatively accurate frequency domain channel estimation may be obtained.

Figure 12:
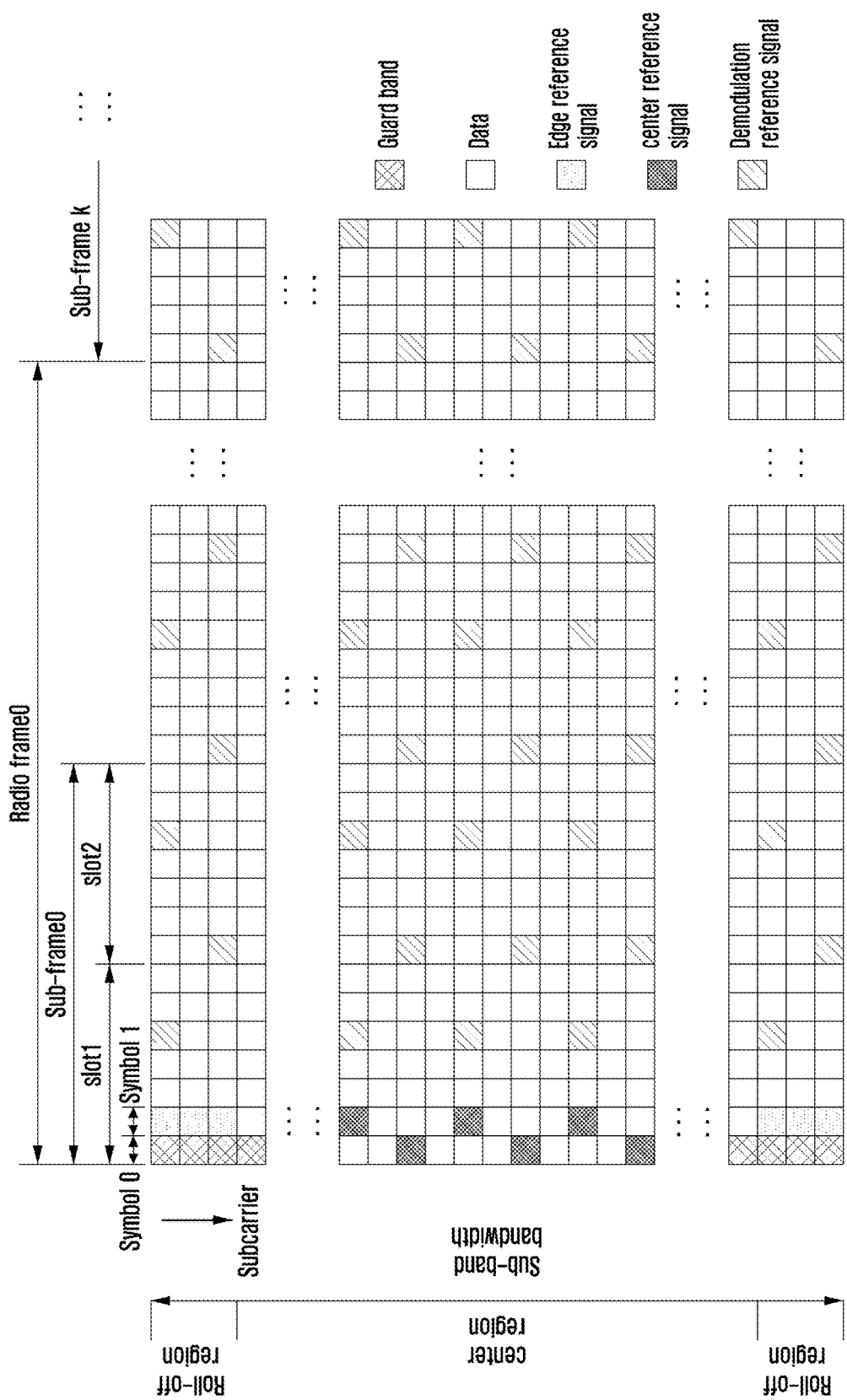
FIG. 12 is a schematic diagram illustrating a reference signal pattern according to some embodiments of the present disclosure.

One example of the above time-frequency resource allocation manner is as shown in FIG. 12. In FIG. 12, the first two symbols are used for estimating frequency domain response of the filter, i.e. they are filter symbols. The edge reference signals and the center reference signals in the filter symbols are referred to as filter reference signals in general. Considering that the filter is stable and no frequent estimation is required, the filter symbol and filter reference signals may be transmitted with a low frequency, e.g., as shown in FIG. 12, once in one radio frame. In addition, it should be noted that, the center reference signals in the center region may be inserted discretely as shown in FIG. 12, or may be inserted continuously, i.e., the filter reference signals transmitted may be transmitted on consecutive subcarriers in the center region.

Figure 13:
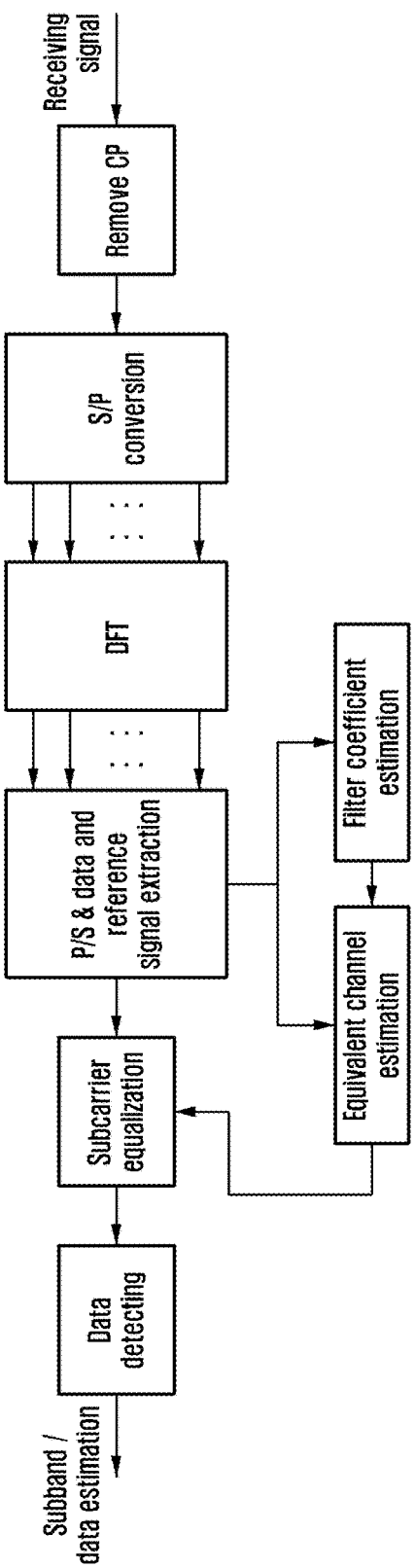
FIG. 13 is a schematic diagram illustrating a receiver according to embodiment 2 of the present disclosure.

FIG. 13 is a schematic diagram illustrating a receiver of subband 1 according to this embodiment. In FIG. 13, the receiver performs a multi-carrier demodulation firstly, and estimates the frequency-domain equivalent channel according to the allocation of time-frequency resources and the reference signal pattern. Specifically, $H_f(m)$ and $H_f(m) F_f(m)$ may be estimated based on the filter reference signals in the filter symbols, so as to obtain the frequency domain response $F_f(m)$ of the filter of each subcarrier. As to the other symbols, the frequency domain equivalent channel estimation $H_f(m) F_f(m)$ of the center region of the corresponding subcarriers may be obtained according to the demodulation reference signals in the center region. The equivalent channel estimation $H_f(m)F_f(m)$ of the corresponding subcarriers may be obtained according to the demodulation reference signals in the roll-off region. Through an interpolation operation to the channel estimation of the center region, it is also possible to obtain the equivalent channel estimation assuming that the roll-off region is flat, and the frequency domain equivalent channel in the roll-off region may be corrected according to the estimated frequency domain response $F_f(m)$ of the filter. This estimated value may be used for the subsequent data detection and demodulation.

In other words, at the receiver, the process of estimating the equivalent channel frequency domain response includes:

Among the reference signals, the frequency domain response of the equivalent channel is estimated according to the reference signals in the first carrier modulated symbol, the frequency domain response of the physical channel is estimated according to the reference signals in the second carrier modulated symbol, and the frequency domain response of the time domain filter used by the transmitter is estimated according to the frequency domain response of the equivalent channel and the frequency domain response of the physical channel. Among the reference signals, the frequency domain response of the equivalent channel in the carrier modulated symbols except for the first and second carrier modulated symbols is estimated according to the demodulation reference signals, and the frequency domain response of the equivalent channel of the M consecutive subcarriers at the edge of the subband in these carrier modulated symbols is corrected according to the frequency domain response of the time domain filter.

As described above, the first carrier modulated symbol is the carrier modulated symbol bearing both the edge reference signals and center reference signals in the reference signal pattern, and the second carrier modulated symbol is the carrier modulated symbol bearing only the center reference signals in the reference signal pattern. The edge reference signals are the reference signals born by the M consecutive subcarriers. The center reference signals are the reference signals born by the subcarriers of the first and second carrier modulated symbols except for the M consecutive subcarriers. The demodulation reference signals are reference signals distributedly located in the whole subband bandwidth in the carrier modulated symbols except for the first and second carrier modulated symbols, wherein M is a natural number determined by the property of the time domain filter of the subband.

The filter reference signal pattern of the filter symbol is determined by the property of the used time domain filter. Specifically, the roll-off coefficient of the filter may be defined as:

$$\alpha = \frac{W_{all} - W_C}{W_{all}};$$

wherein W_all is the available bandwidth of the subband, $W_C$ is the bandwidth of the center region. In order words, the roll-off coefficient $\alpha$ is defined as a ratio of the bandwidth of the roll-off region and the whole available bandwidth of the subband. The number M of subcarriers at the edge of the subband where the edge reference signals are inserted may be determined according to the roll-off coefficient $\alpha$ and the subband bandwidth. The center reference signal pattern and the demodulation reference signal shown in FIG. 11 may be designed according to a maximum delay spread and a maximum Doppler frequency shift supported by the transmitter. For further details, reference may be made to cell-specific reference signal (CRS) or CSI-RS design in the LTE/LTE-A.

Similar to embodiment 1, in this embodiment, the edge reference signals in the subband edge area may also be in a distributed manner. In this situation, the edge reference signals may be inserted discretely in frequency domain resources of the M consecutive subcarriers at the edge of the subband. The number of subcarriers between two adjacent edge reference signals is smaller than a predefined carrier threshold. The center reference signals may be inserted distributedly or continuously in the frequency domain resources except for the M subcarriers at the edge of the subband. The value of M may be determined according to the frequency domain response property of the time domain filter of the subband, similarly as described above.

After determining the reference signal pattern, the system informs the receiver of the reference signal pattern via a broadcast channel or a control channel. For the reference signal pattern provided by this embodiment, the information needs to be provided to the receiver includes transmission positions of the filter symbol, the filter reference signals, the filter reference signal pattern and demodulation reference signal pattern. The filter symbol may be transmitted periodically. Thus, the position of the filter symbol in the radio frame may be fixed, and provided to the receiver via the broadcast channel or the control channel. The reference signal pattern including the filter reference signals and demodulation reference signals is related to the subband bandwidth. One possible method is to configure fixed subband bandwidth and reference signal pattern, and let them known by the transmitter and receiver. At this time, the transmitter informs the receiver of the subband bandwidth. The receiver is able to obtain the reference signal pattern according to the subband bandwidth, and perform estimation of equivalent channel and data demodulation according to the reference signal pattern. If the transmitter uses different time domain filters for the same subband bandwidth, the same subband bandwidth may correspond to several reference signal patterns. In this case, besides the subband bandwidth, the receiver also needs to be informed about the reference signal pattern.

Another method is to inform receiver about the reference signal pattern directly, i.e. informing the receiver of the time-frequency resources allocated for the reference signals. For example, the receiver can be informed about the number of subcarriers continuously occupied by the filter reference signals at the edge of subband by means of index.

It should be noted that, the solutions in embodiments 1 and 2 are both based on the CP-OFDM carrier modulation with time domain filtering. Other kinds of carrier modulation, such as SC-FDMA, and OFDM carrier modulation with cyclic prefix and cyclic postfix, may also be combined with the time domain filter, and be used for estimating the frequency domain equivalent channel consisting of the time domain filter and the physical channel.

It should also be noted that, the method mentioned in embodiment 1 may also be used for estimating the frequency domain response of the filter, the estimation is similar to that in embodiment 2, i.e., the following processing can be performed at the receiver:

1. Estimate the channel state information of the equivalent channel consisting of the time domain filter and the physical channel of the passband which is relatively flat based on the center reference signals, and obtain the equivalent channel state information of the time-frequency resources carrying no reference signals by means of interpolation.

2. Estimate the equivalent channel state information at the edge of subband according to the edge reference signals.

3. According to the channel state information at the edge of the subband obtained according to the center reference signals and the interpolation and the equivalent channel state information obtained in 2, obtain the frequency domain response of the filter at the edge of subband, which may be used for correcting the estimation of the channel at the edge of the subband in the following channel estimation (e.g., correcting the estimation of the channel estimation at the edge of the subband of the carrier modulated symbol without edge reference signals).

In other words, during the estimation of the equivalent channel, the frequency domain coefficients of the equivalent channel on the subcarriers carrying the center reference signals are estimated according to the center reference signals, and the frequency domain response of the equivalent channel on the whole subband is obtained by interpolating in the time and frequency domain. The equivalent channel frequency domain response on the M consecutive subcarriers at the edge of subband is estimated according to the edge reference signals. The frequency domain response of the filter on the M consecutive subcarriers may be obtained according to the equivalent channel frequency domain response on the M consecutive subcarriers obtained based on the center reference signal and the interpolation and the equivalent channel frequency domain response on the M consecutive subcarriers obtained based on the edge reference signals, and may be used for correcting the equivalent channel frequency domain response on the M consecutive subcarriers.

Embodiment 3

The method described in embodiment 2 transmits reference signals periodically. Based on the periodic transmission of reference signals, an aperiodic transmission triggered by a transmitter or a receiver can also be used to transmit the reference signals. Meanwhile, the reference signal transmission method described in this embodiment can be combined with the reference signal transmission method in embodiment 1.

Specifically, the estimation of a frequency domain response of a filter determines accuracy of the subsequent channel estimation. Considering the overhead, the insertion frequency of the filter symbol and filter reference signals used for the estimation of the frequency domain response of the filter is relatively low. Therefore, if there is an error in the estimation of the frequency domain response of the filter, the estimation of the frequency domain equivalent channel at the edge of subband during data transmission may have an error, which will lead to decrease of the system performance. Due to the sparsity of the inserted filter reference signals, it may take a long time to remove such error. In order to eliminate the impact brought out by the estimation error of the frequency domain response of the filter to the system performance, improve channel estimation flexibility and have a tradeoff between the overhead and channel estimation accuracy, the aperiodic reference signal transmission is introduced based on the above periodic transmission of the filter reference signals.

Figure 14:
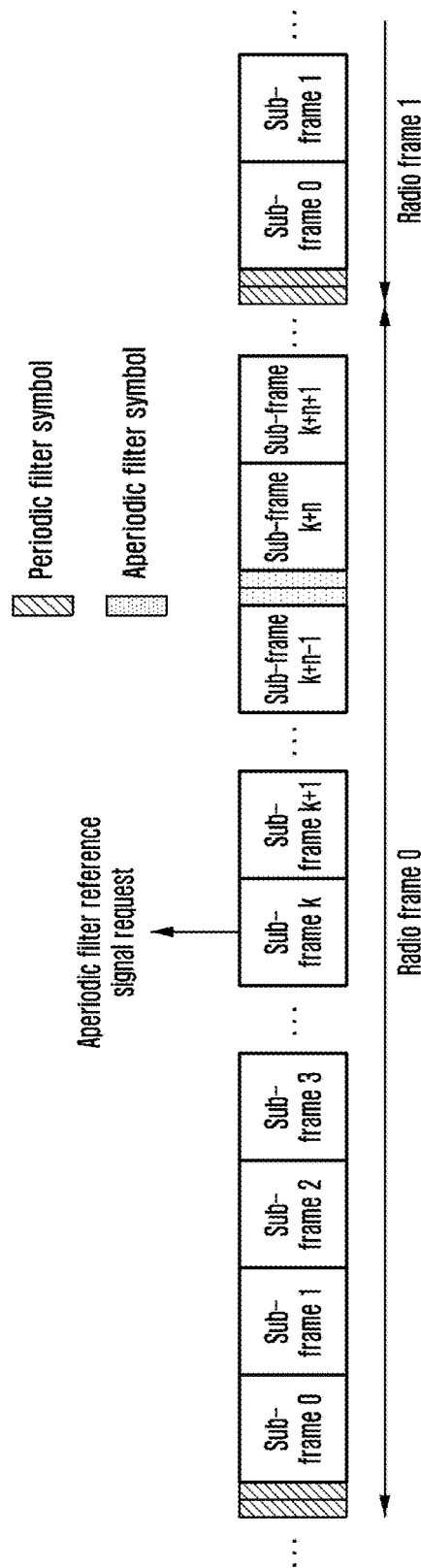
FIG. 14 is a schematic diagram illustrating a transmission manner of aperiodic filter reference signals according to some embodiments of the present disclosure.

FIG. 14 shows a receiver-triggered aperiodic reference signal transmission method. When determining that data signal detection accuracy is lower than a preset accuracy threshold, the receiver transmits an aperiodic reference signal transmission request to the transmitter. It can be seen that, besides the periodic transmitted filter reference signals, the receiver transmits the aperiodic reference signal transmission request to the transmitter in the sub-frame k. After receiving the aperiodic reference signal transmission request, the transmitter transmits the aperiodic reference signals after a fixed time interval, for example, after n sub-frames.

A transmitter-triggered aperiodic reference signal transmission method may be as follows, before transmitting the aperiodic reference signals, the transmitter transmits an of aperiodic reference signal transmission indication signal via a broadcast channel or a control channel to inform the receiver about the transmission of the aperiodic reference signals. The aperiodic reference signal and the periodic filter reference signal may have the same or different structures, and may use the same or different reference signal sequences.

As described above, after the receiver receives the aperiodic reference signal transmission indication from the transmitter, or after the preset time interval since the receiver transmits the aperiodic reference signal transmission request to the transmitter, the receiver receives the aperiodic reference signals, and corrects the frequency domain response of the time domain filter according to the aperiodic reference signals. Specifically, after receiving aperiodic reference signals, the receiver estimates the frequency domain response of the filter of the transmitter, corrects the original frequency domain response of the filter, and uses the corrected frequency domain response to estimate the frequency domain equivalent channel and demodulate data of subsequent symbols.

In the above processing, the aperiodic reference signals transmitted by the transmitter may be the filter reference signals in embodiment 2. In other words, the transmitting the aperiodic reference signals includes: transmitting a first carrier modulated symbol and a second carrier demodulation symbol. In addition, considering that the filter symbol and filter reference signals in embodiment 2 occupy two continuous symbols, which may affect the resource utilization.

In order to enhance the resource utilization and reduce the resource occupied by the aperiodic reference signals, the reference signal solution described in embodiment 1 can be adopted for transmitting the aperiodic reference signals. When receiving the aperiodic reference signal transmission request, the transmitter transmits the edge reference signals and center reference signals as shown in FIG. 10, for estimating the frequency domain equivalent channel consisting of the time domain filter and the physical channel, i.e. transmitting one first filter symbol when it is required to transmit the aperiodic reference signals. At this time, the allocation of the time-frequency resources and possible distribution of reference signals are shown as FIG. 15.

Figure 15:
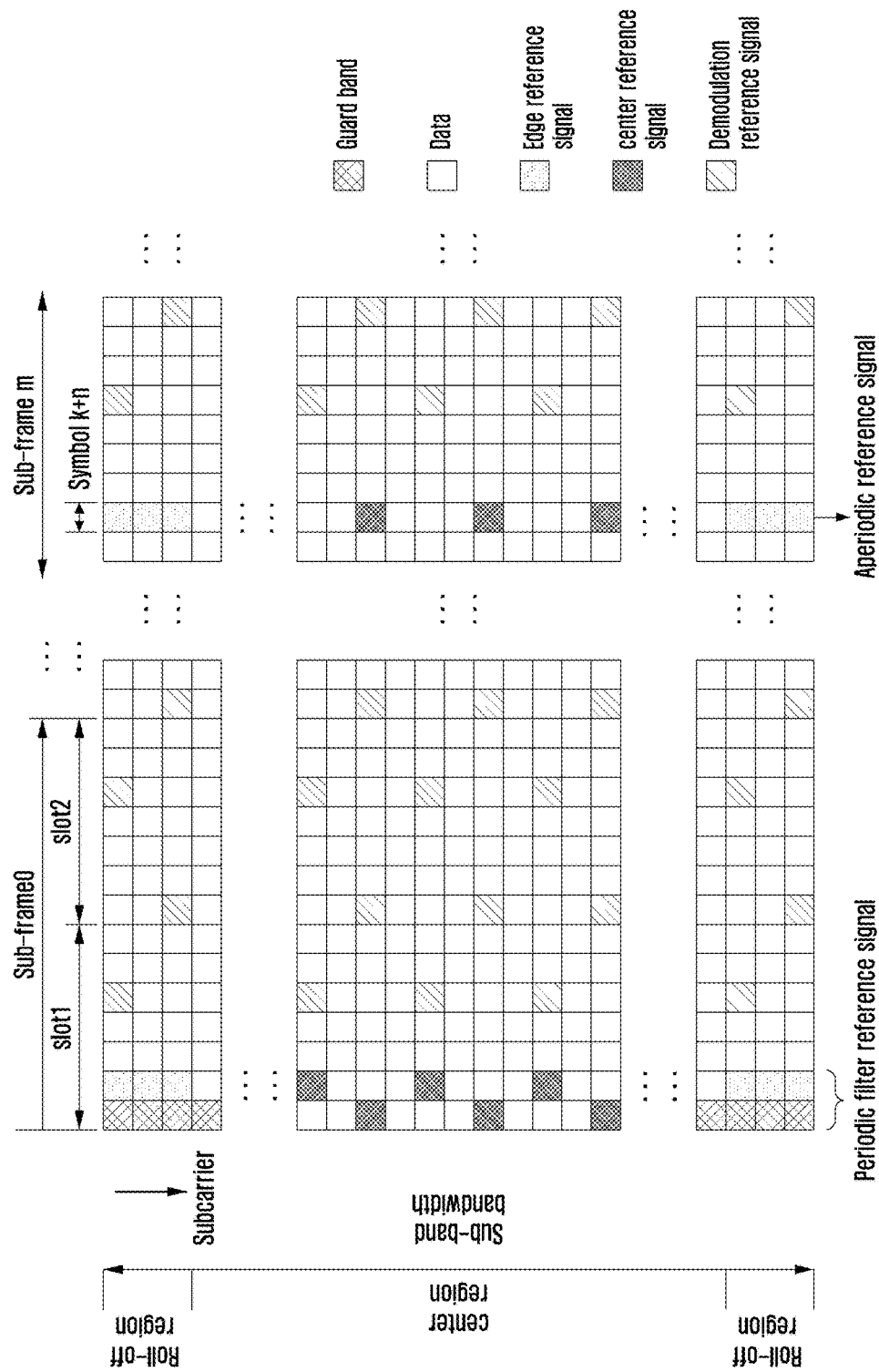
FIG. 15 is a schematic diagram illustrating time-frequency resources for transmitting the aperiodic reference signals according to some embodiments of the present disclosure.

In FIG. 15, the aperiodic filter reference signal transmission request is transmitted by the receiver in symbol k, and the aperiodic reference signals are transmitted in symbol k+n. The aperiodic reference signal has the structure similar as the reference signal shown in FIG. 10, which is determined by the edge reference signal and the center reference signal. The aperiodic reference signal is used for estimating the frequency domain equivalent channel state information including the edge of subband. Since the reference signals are inserted in several consecutive subcarriers at the edge of the subband, it is possible to estimate the whole frequency domain equivalent channel including the spectrum distortion caused by the time domain filter. As such, the estimation of the frequency domain response of the filter may be corrected, and the corrected frequency domain response may be used for the frequency domain equivalent channel estimation and data demodulation of subsequent data symbols.

In view of the above, if the transmitted aperiodic reference signals include one first carrier modulated symbol and one second carrier modulated symbol, the correcting the frequency domain response of the time domain filter by the receiver according to the aperiodic reference signals includes: estimating the frequency domain response of the time domain filter according to the transmitted first carrier modulated symbol and the second carrier modulated symbol, and correcting the frequency domain response of the time domain filter determined based on the periodic reference signals according to the frequency domain response. Or, if the transmitted aperiodic reference signal includes one first carrier modulated symbol, the correcting the frequency domain response of the time domain filter by the receiver according to the aperiodic reference signals includes: estimating the equivalent channel frequency domain response according to the first carrier modulated symbol, and correcting the frequency domain response of the time domain filter determined based on the periodic reference signals according to the equivalent channel frequency domain response.

Embodiment 4

In this embodiment, synchronization signal of a conventional system are utilized to assist the estimation of a frequency domain response of a filter and a frequency domain estimation of an equivalent channel consisting of the filter in the time domain and a physical channel.

In current wireless communication standard LTE-A, synchronization signal may include primary synchronization signal (PSS) and secondary synchronization signal (SSS), which are used for cell search and initial downlink synchronization. In a frequency division duplex (FDD) system, the PSS is transmitted in symbol 6 in sub-frames 0 and 5 of a radio frame, and the SSS is transmitted in symbol 5 of sub-frames 0 and 5 of the radio frame. In the frequency domain, the PSS and the SSS occupy 6 continuous resource blocks (RB) in the middle of the bandwidth.

In the time domain, the PSS and the SSS are located in adjacent symbols and are transmitted in each radio frame. Therefore, they may be used for estimating the frequency domain response of the filter of the subband. Specifically, the PSS may be used for estimating the frequency domain response $H_f(m)$ of the physical channel and no time domain filtering is performed to the symbol carrying the PSS, and no data is transmitted on the several consecutive subcarriers at the edge of subband in the carrier modulated symbol where the PSS is located. The SSS may be used for estimating the frequency domain response $H_f(m)F_f(m)$ of the equivalent channel consisting of the time domain filter and the physical channel. The same time domain filtering as the data is performed to the symbol carrying the SSS. Meanwhile, reference signals are additionally carried by the M consecutive subcarriers at the edge of the subband of the carrier modulated symbol where the SSS is located. For the transmitter and the receiver whose subband bandwidth is similar to that occupied by the synchronization signal and includes the synchronization signal, for example, the subband bandwidth is 6 RBs and is located in the middle of system bandwidth, the overhead of the reference signals may be decreased effectively by using the PSS and the SSS as the reference signals.

Figure 16:
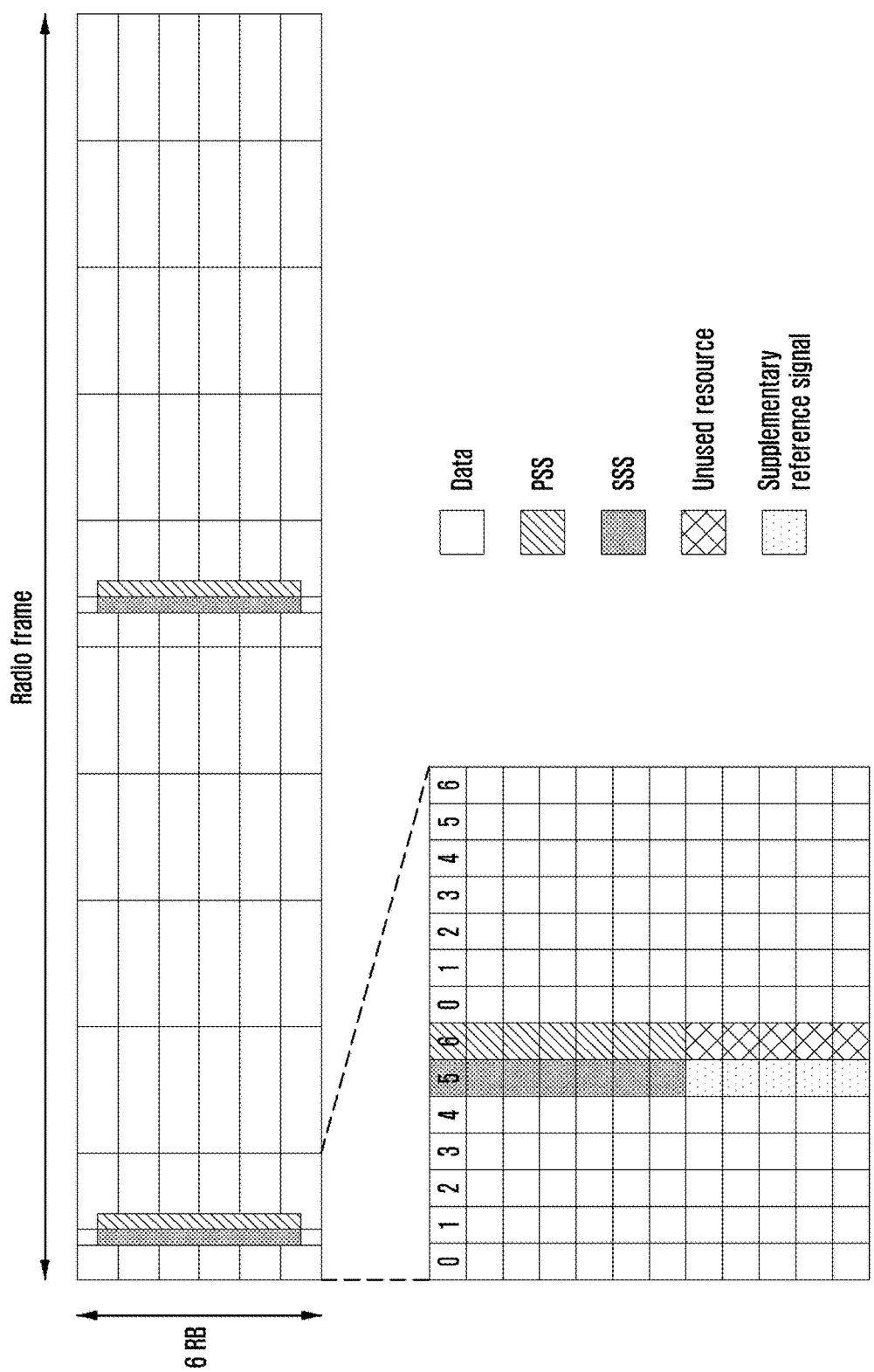
FIG. 16 is a schematic diagram illustrating a frame structure of the PSS and the SSS according to some embodiments of the present disclosure.

FIG. 16 shows a frame structure in which the PSS and the SSS are taken as the reference signals according to some embodiments of the present disclosure. As shown in FIG. 16, the subband bandwidth is 6 RBs, and the PSS occupies 6 continuous RBs, but the 5 subcarriers at the edge of the subband are not used for data transmission. The PSS in this embodiment is used for the estimation of the frequency domain response of the physical channel and no time domain filtering which is used for reducing inter-subband interference is performed. Therefore, the subcarriers not used for data transmission are used as a guard band between subbands.

The SSS is processed with the same time domain filtering as the data, and is used for the estimation of the equivalent channel consisting of the time domain filter and the physical channel. Meanwhile, it is required to estimate the channel distortion caused by the transition band of the time domain filter at the edge of subband. Therefore, known reference signal needs to be added on the un-used subcarriers. The added reference signal may be a part of the SSS, or a specific designed reference signal.

Reference signal pattern on other time-frequency resources may be designed similarly as the CRS, UE-specific RS or CSI-RS.

Considering that the pass-band of the filter for the subband filtering is relatively flat, even a filter with basically unchanged pass-band amplitude may be obtained through better design, the time domain filtering does not affect the SSS signal synchronization dramatically. For a receiver just accessing the system, the PSS and the SSS are still used for cell search and downlink synchronization. For the receiver has accessed to the system and is allocated with the resources transmitting the PSS and the SSS, the frame structure as shown in FIG. 16 may be used. The PSS is used for estimating the frequency domain response of the physical channel, and the SSS is used for estimating the frequency domain response of the equivalent channel. These two estimation results are combined to obtain the frequency domain response of the time domain filter used by the transmitter on the whole subband. The estimation of the equivalent channel may be obtained according to the reference signals on other time-frequency resources. The equivalent channel estimation at the edge of subband is corrected according to the frequency domain response of the time domain filter, and then may be used for the subsequent data demodulation.

For a system whose subband bandwidth is larger than the bandwidth occupied by the PSS and the SSS, the PSS and the SSS may still act as part of the filter reference signals to assist the estimation of the frequency domain response of the filter.

It can be seen from the description above, the reference signal pattern in this embodiment is similar to that of embodiment 2, merely the carrier modulated symbol where the PSS and the SSS is located is used as the filter symbol. Besides the method mentioned above, the SSS may be used as the second filter reference signal to estimate the frequency domain response of the physical channel. The PSS with the reference signals added on the consecutive subcarriers at the edge of band may be used as the first filter reference signal to estimate the frequency domain response of the equivalent channel consisting of the time domain filter and the physical channel. In other words, in the reference signal pattern, the carrier modulated symbol where the PSS is located is used as the second carrier modulated symbol, and the carrier modulated symbol where the SSS is located and predefined reference signals are inserted on M consecutive subcarriers at the edge of the subband is used as the first carrier modulated symbol. Or, in the reference signal pattern, the carrier modulated symbol where the SSS is located is used as the first carrier modulated symbol; and the carrier modulated symbol where the primary synchronization signal is located and predefined reference signals are inserted on M consecutive subcarriers at the edge of the subband is taken as the first carrier modulated symbol.

Embodiment 5

In this embodiment, signal transmitting and receiving methods in a filtering-based carrier modulation system are described with reference to specific system configuration. The system configuration is similar as embodiment 1. The transmitter is equipped with multiple transmission antennas which may transmit multiple data streams to enhance the data rate or same data to improve the reliability. The receiver is equipped with one or more receiving antennas. For a multi-antennas transmitter equipped with $N_T$ antennas, it is required to transmit $N_T$ orthogonal reference signal sequences.

For the reference signal transmission method provided by various embodiments of the present disclosure, a conventional method may be adopted for the center reference signals, e.g., transmitting $N_T$ reference signals via orthogonal resources, the orthogonal resources include any one or any combination of orthogonal time resources, orthogonal frequency resources, and orthogonal reference signal sequences. As to the edge reference signals which are used for estimating the frequency domain response of the equivalent channel at the edge of the subband, the reference signal pattern should be designed carefully to reduce the overhead of reference signals.

As to the signal transmission method described in embodiment 1, the time domain filtering is performed to all of the reference signals, therefore what is obtained according to these reference signals is the frequency domain response of the equivalent channel. The frequency domain response of the equivalent channel includes a physical channel part and a time domain filter part. For different data layers, although the time domain filters may be same, the frequency domain responses of the equivalent channels of different data layers may be different since the physical channels corresponding to different antennas may be different. Based on this, it is required to transmit reference signals respectively for different data layers to estimate the frequency domain response of the equivalent channel of respective data layer. Therefore, different data layers also needs to use orthogonal resources to transmit the reference signals. The orthogonal resources used by center reference signals and edge reference signals may be the same or different. For example, the center reference signals are designed similarly as the CRS or the UE-specific RS. The edge reference signals of different data layers adopt a time division manner, as shown in FIG. 17.

Figure 17:
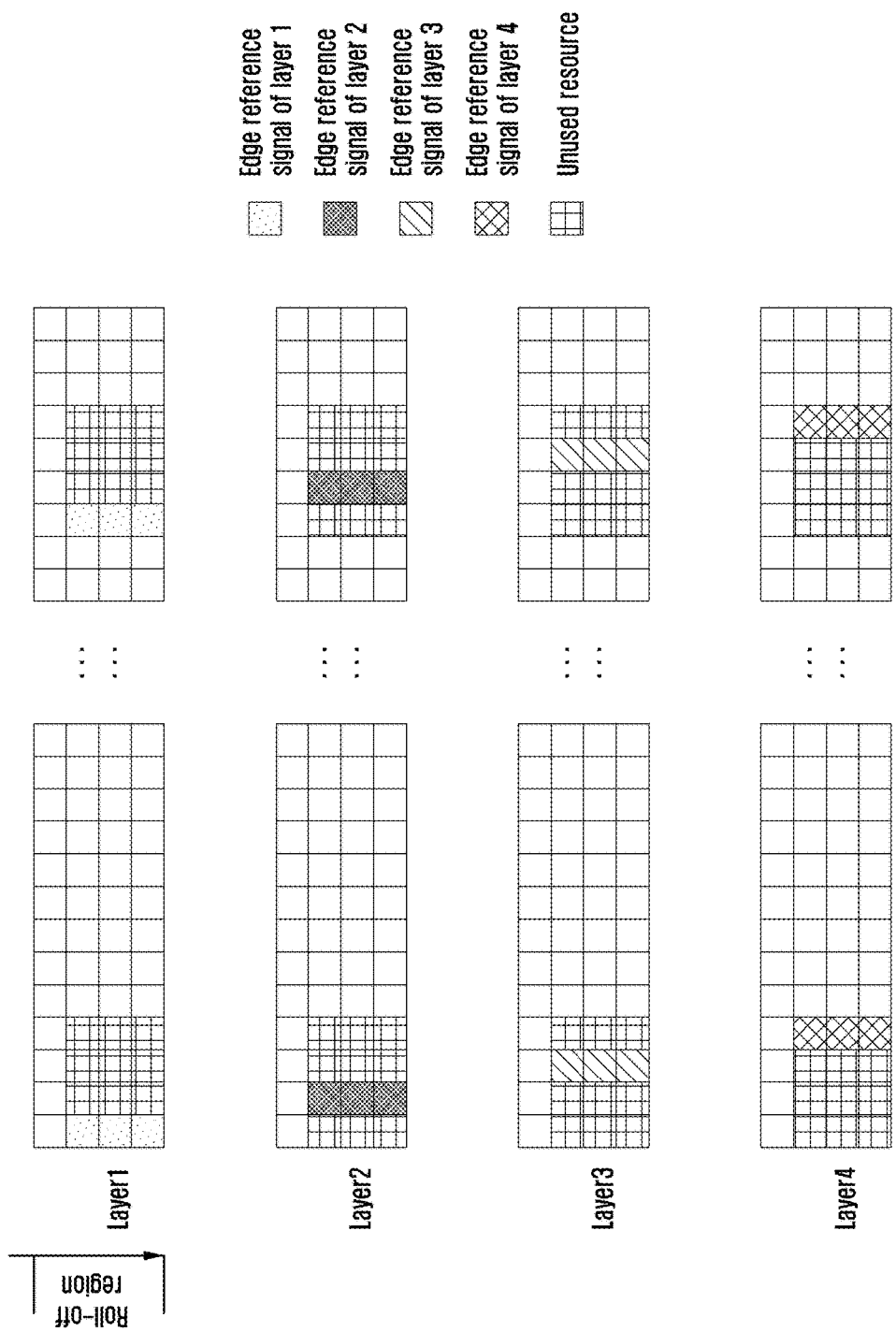
FIG. 17 is a schematic diagram illustrating a possible multi-layer edge reference signal pattern according to some embodiments of the present disclosure.

In FIG. 17, the edge reference signals in the roll-off region when there are 4 data layers are shown, wherein the reference signals of each layer are transmitted via orthogonal time resources. Besides differentiating the reference signal in each layer by the orthogonal time resources as shown in FIG. 17, orthogonal code sequences may be used in combination to support more layers with the same overhead. For example, in FIG. 17, on the time-frequency resources of the reference signals of layer 1, the edge reference signals of 3 layers are multiplexed via orthogonal code sequences of length 3.

As described above, for different data layers, their respective center reference signals and edge reference signals need to be transmitted. Accordingly, the transmitter transmits the reference signal pattern of each data layer to the receiver, and indicates a corresponding relationship between the reference signal pattern information and the data layer. The receiver receives the corresponding relationship between the reference signal pattern information and the data layer, and performs equivalent channel estimation for respective data layer.

As to the signal transmission method in embodiment 2, the frequency domain response of time domain filter may be estimated according to the filter reference signals. Because the time domain filters of different data layers are the same, it is not necessary to estimate the frequency domain response of time domain filter for each layer. A transmitting method of filter symbols is shown as FIG. 18.

Figure 18:
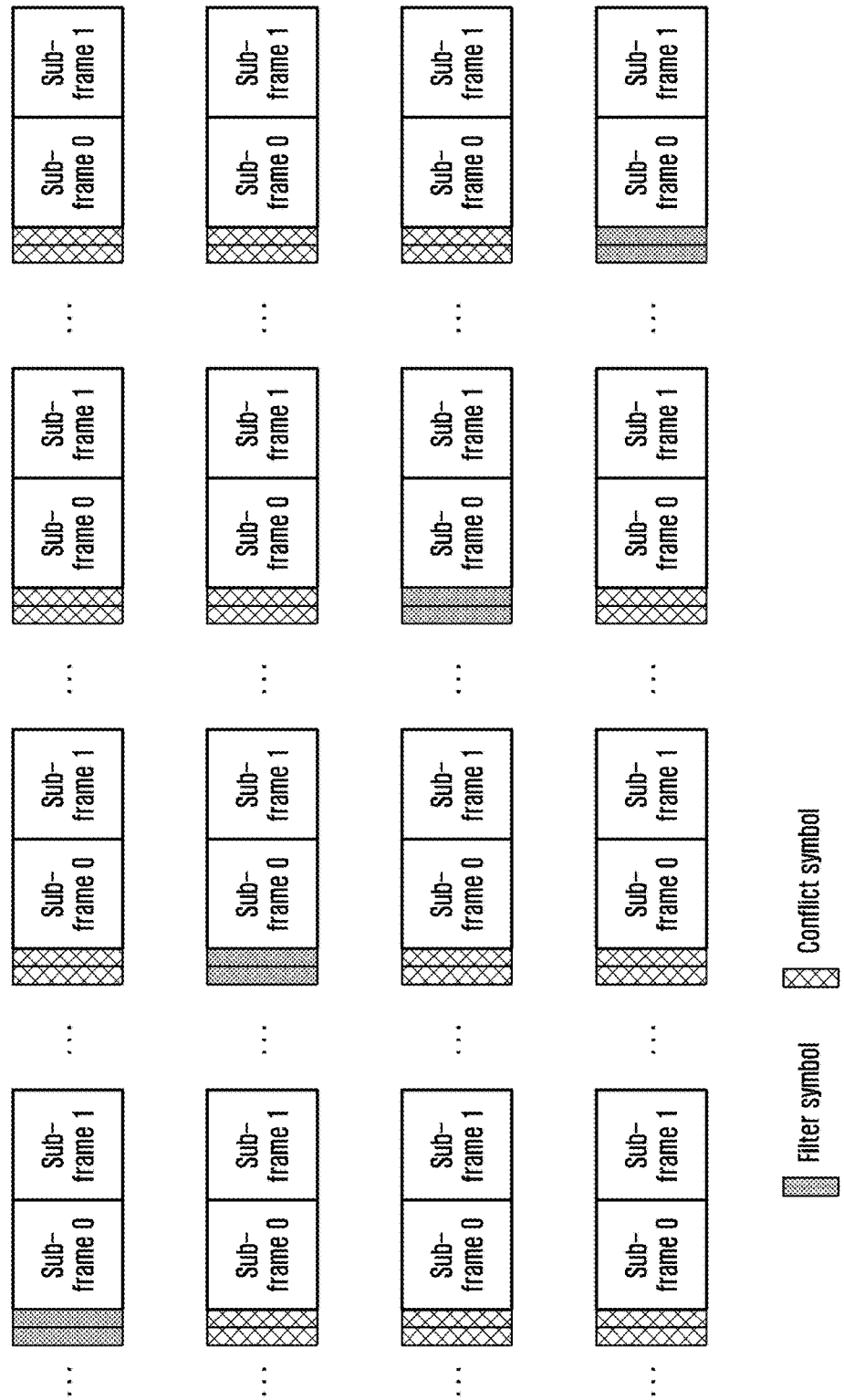
FIG. 18 is a schematic diagram illustrating a transmission manner of the multi-layer filter symbols according to some embodiments of the present disclosure.

In FIG. 18, the filter symbols are transmitted on only one data layer when required to be transmitted. Meanwhile, no data is transmitted on the subcarriers in corresponding symbols of other layers conflicting with the time-frequency resources used by the filter reference signals, so as to avoid interference to the filter reference signals. Meanwhile, the filter symbol of different radio frames or different subframes may be transmitted on different layers, as shown in FIG. 18. Or, it is possible to select a data layer to transmit the filter symbols according to channel state information of each layer fed back by the receiver. For example, a layer with better channel quality may be selected to transmit the filter symbols. In other words, one data layer may be selected according to the channel state fed back by the receiver to transmit the first and second carrier modulated symbols. Since the filter symbols are transmitted on only one data layer on the same time-frequency resources, it is not necessary to use orthogonal sequences for the filter reference signals on different data layers, and it is not necessary for the transmitter to inform the receiver on which data layer the filter symbols are transmitted. The above describes the method for transmitting the filter symbols of different data layers. As to the demodulation reference signals, since they are used for equivalent channel estimation, the demodulation reference signals need to be transmitted on respective data layers, and orthogonal resources need to be used for the demodulation reference signals on different data layers.

As described above, for different data layers, the filter symbols may be transmitted on only one data layer. After receiving the filter symbols on the corresponding data layer, the receiver estimates the frequency domain response of the filter, and uses it to correct the equivalent channel frequency domain response of each layer. Meanwhile, for different data layers, the demodulation reference signals are transmitted on respective data layers. The transmitter needs to transmit position information of demodulation reference signals on each data layer to the receiver, and indicates a relationship between the position information and the data layer. The receiver receives the relationship between the demodulation reference signal position information and the data layer, and performs equivalent channel estimation for carrier modulated symbols of the corresponding data layer.

In addition, as described above, embodiment 1 may obtain the frequency domain response of the filter similarly as embodiment 2. Therefore, similar to embodiment 2, one data layer is used for transmitting the edge reference signals for estimating the frequency domain response of the filter. However, according to the signal transmission manner mentioned in embodiment 1, the frequency domain response of the filter is estimated according to an equivalent channel property at the edge of the subband (including a passband property and a physical channel property) obtained by interpolating based on the center reference signals and an equivalent channel property at the edge of the subband (including a roll-off property and a physical channel property) estimated based on the edge reference signals. Therefore, it is less accurate compared with the direct equivalent channel estimation of respective data layer via the orthogonal resources. Or, the transmission of the edge reference signals on different data layers via orthogonal resources and the transmission of the edge reference signals on a single layer may be combined. For example, the edge reference signals may be transmitted on respective data layers via orthogonal resources with a long periodicity, and one data layer is selected from those transmitting the periodic orthogonal edge reference signals to transmit the edge reference signals, for estimating the frequency domain response of the filter and correcting the equivalent channel state information.

It may be seen that, in the multi-antennas system, the overhead for transmitting the reference signals is relatively high in embodiment 1, and the overhead for transmitting the reference signals in embodiment 2 is relatively low.

In view of the above, in accordance with the transmission method in embodiment 1, if the transmitter has multiple transmission antennas, at the receiver, the receiving the reference signal pattern information and determining the reference signal pattern includes:

receiving the reference signal pattern information of each data layer, determining the reference signal pattern corresponding to respective data layer based on the corresponding relationship between the reference signal pattern information and the data layer, wherein the reference signal pattern of respective data layer is used for estimating the equivalent channel frequency domain response of each data layer; or, receiving pattern information of the periodically transmitted first edge reference signals and the center reference signals of each data layer, determining the first edge reference signals and the center reference signals corresponding to respective data layer based on the corresponding relationship between the pattern information and the data layer, wherein the first edge reference signals and the center reference signals are used for estimating the equivalent channel frequency domain response of each data layer;

receiving pattern information of the second edge reference signals, determining the pattern of the second edge reference signals to estimate the frequency domain response of the time domain filter, so as to correct the equivalent channel frequency domain response on each data layer.

In accordance with the transmission method in embodiment 2, if the transmitter has multiple transmission antennas, at the receiver, the receiving the reference signal pattern information and determining the reference signal pattern includes:

receiving reference signal pattern information of the first carrier modulated symbol and second carrier modulated symbol, determining the reference signal pattern of the first carrier modulated symbol and the second carrier modulated symbol, wherein the first carrier modulated symbol and the second carrier modulated symbol are used for estimating the frequency domain response of the time domain filter; receiving pattern information of the demodulation reference signals of each data layer, determining the demodulation reference signal pattern corresponding to respective data layer based on the corresponding relationship between demodulation reference signal pattern information and the data layer, wherein the demodulation reference signals are used for estimating the equivalent channel frequency domain response of the carrier modulated symbols on each data layer.

Embodiment 6

The above embodiments describe signal transmission and receiving with respect to one subband. In this embodiment, a signal transmitting and receiving method of adjacent subbands in a carrier modulation system is described with reference to specific system configuration, especially a carrier modulation system in which adjacent subbands have different carrier modulation parameters. The system configuration is similar as that of embodiment 1. A transmitter transmits data on multiple subbands simultaneously. The data on multiple subbands may be transmitted to a same receiver, or to different receivers. The multiple subbands may use the same or different carrier modulation parameters, such as same or different subcarrier spacings, CP lengths and so on. Several subcarriers are reserved as a guard band between the adjacent subbands, no data or signaling is transmitted on these subcarriers.

In a conventional filtering-based carrier modulation system, the receiver adopts a matched filter to eliminate interferences from other subband. In embodiments of the present disclosure, the receiver does not have any information about the filter used by the transmitter, thus cannot perform the matched filtering. Through properly designing the filter and reserving several subcarriers as the guard band, the inter-subband interferences may be reduced. But some residual inter-subband interferences still exist at the edge of the subband, which may be more serious when different subbands use different carrier modulation parameters.

As to the solution provided by embodiment 1, if the adjacent subbands use the same reference signal pattern, the edge reference signals transmitted on several consecutive subcarriers at the edge of the subbands may lead to inter-subband interferences, which may result in inaccurate channel estimation at the receiver, which may affect the receiving performance of the whole system. Likewise, as to the solution provided by embodiment 2, if the adjacent subbands use the same reference signal pattern, the residual inter-subband interferences may leads to inaccurate estimation of the frequency domain response of the filter, which results in inaccurate correction of the equivalent channel and in turn affect the performance of system.

Figure 19:
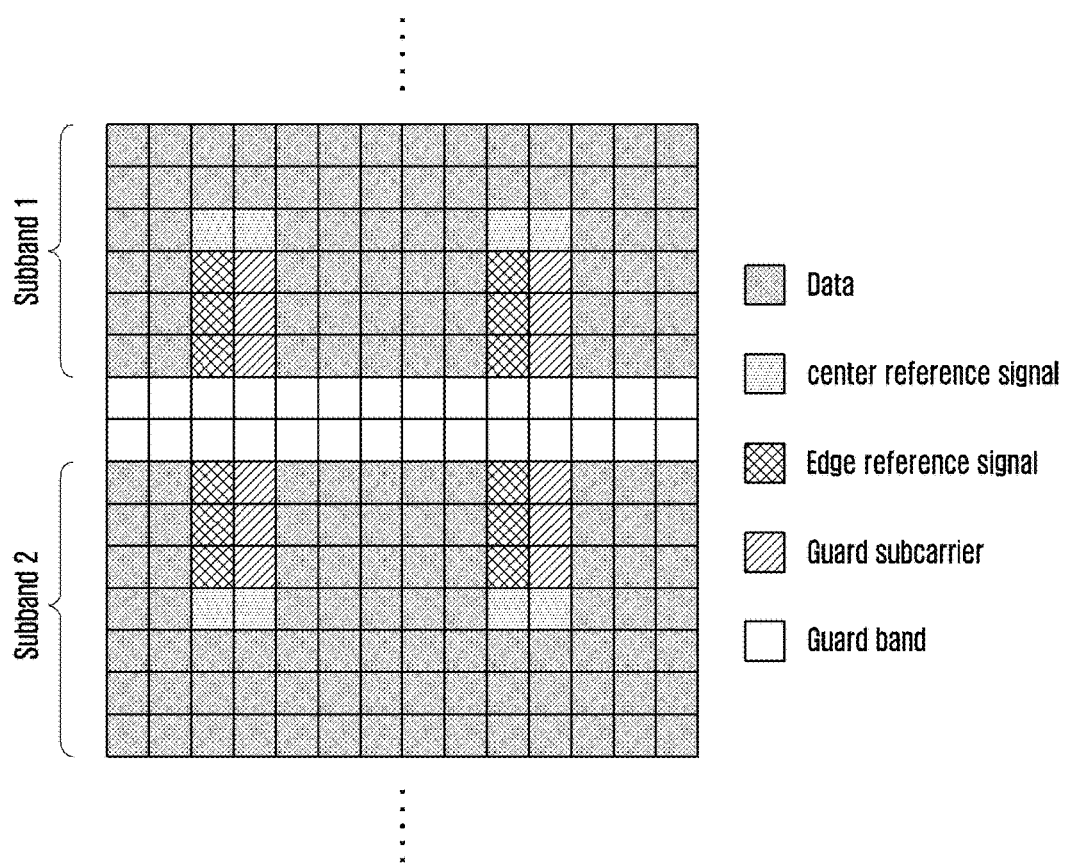
FIG. 19 is a schematic diagram illustrating a first edge reference signal pattern according to embodiment 6 of the present disclosure.

In order to solve the problem, this embodiment provides that: the edge reference signals of adjacent subbands are not transmitted in the same carrier symbol, and the edge reference signals of the adjacent subbands are carried alternately by different time-frequency resources. Specifically, as to the solution provided by embodiment 1, FIG. 19 shows the pattern of the edge reference signals. Subband 1 and subband 2 are adjacent subbands, and a small number of subcarriers are used as a guard band between them. To avoid the impact of the inter-subband interferences to the channel estimation, the two subbands transmit the edge reference signals on adjacent time resources, and several subcarriers are reserved in the symbol on which the adjacent subband transmits the edge reference signals as guard subcarriers. In other words, the edge reference signals of subband 1 and the edge reference signals of subband 2 are located in adjacent carrier modulated symbols. For the subband 1, in the carrier modulated symbol on which subband 2 transmits the edge reference signals, some subcarriers adjacent to subband guard band is regarded as guard subcarriers. For the subband 2, in the carrier modulated symbol on which subband 1 transmits the edge reference signals, some subcarriers adjacent to subband guard band is regarded as guard subcarriers. The number of guard subcarriers may be determined according to factors such as design of the filter and subband bandwidth. In order words, if the subband is wide and the filter is designed to have a low out-of-band emission, relatively fewer guard subcarriers may be used; if the subband is narrow and the design of the filter cannot ensure a fast decreasing of the out-of-band emission, relatively more guard subcarriers may be used. A simple principle is that the number of the guard subcarrier is the same as the number of consecutive subcarriers occupied by the edge reference signals, so as to facilitate the transmitter to inform the receiver about the reference signal pattern. Since the number of subcarriers occupied by the edge reference signals is also subject to the subband bandwidth and the design of the filter, the above principle also meets these requirements.

After adding the guard subcarriers, although the inter-subband interferences still exist, the impact of the inter-subband interferences to the edge reference signals is reduced dramatically. Thus, the estimation of the equivalent channel may be more accurate, and better performance may be obtained.

Figure 20:
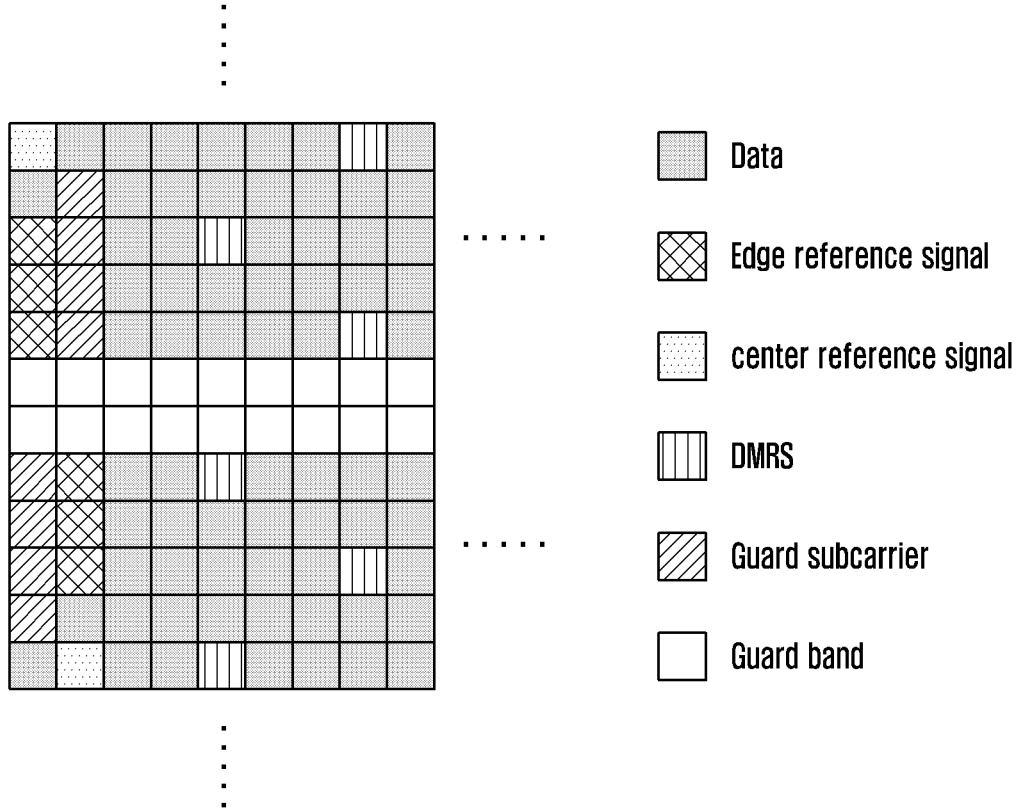
FIG. 20 is a schematic diagram illustrating a second edge reference signal pattern according to embodiment 6 of the present disclosure.

As to the solution provided by embodiment 2, FIG. 20 shows a pattern of the edge reference signals. Subband 1 and subband 2 are adjacent subbands, and a small number of subcarriers are used as a guard band. To avoid the impact of the inter-subband interferences to the estimation of the frequency domain response of the filter, the filter symbols of the two subbands are transmitted in alternate carrier modulated symbols. Specifically, when the subband 1 transmits the first filter symbol, the subband 2 transmits the second filter symbol in the same carrier modulated symbol. When the subband 1 transmits the second filter symbol, the subband 2 transmits the first filter symbol in the same carrier modulated symbol. In other words, for the adjacent subband 1 and subband 2, the first carrier modulated symbol of subband 1 and the second carrier modulated symbol of subband 2 are the same carrier modulated symbol, and the second carrier modulated symbol of subband 1 and the first carrier modulated symbol of subband 2 are the same carrier modulated symbol. Since a guard band is reserved at the edge of the subband in the second filter symbol, there is not much interference to the edge reference signals of first filter symbol. Therefore, the reference signal pattern shown in FIG. 20 may reduce the impact of the inter-subband interference to the estimation of the frequency domain response of the filter. As such, the performance of equivalent channel estimation may be improved and the system performance is improved.

The solution provided in this embodiment is especially applicable for the system having multiple transmitters which occupy different subbands. When transmitting data and reference signals, the transmitters using the adjacent subbands may transmit the reference signals following the reference signal pattern provided by this embodiment.

In addition, the solution provided by this embodiment is also applicable for the multi-antennas transmitting system described in embodiment 5. Specifically, the edge reference signals of different layers are transmitted via orthogonal time-frequency resources. Meanwhile, in the carrier modulated symbol where the adjacent subbands transmit edge reference signals, several subcarriers at the edge of respective subband are not used for transmitting data or reference signals, acting as guard subcarriers. If the filter symbol is adopted to estimate the frequency domain response of the filter, since the filter symbol may be transmitted on one layer, the transmitting method may be same as that described in embodiment 2.

In this embodiment, the edge reference signal pattern of each subband needs to be determined. Specifically, the positions of edge reference signals and the number of occupied subcarriers may change according to the bandwidth and position of subband, which makes it difficult to inform the receiver about the reference signal pattern. A simple but effective solution is that, associating the position of the edge reference signals and the number of the occupied subcarriers with the subband bandwidth and a center frequency point of the subband, and informing the receiver about the reference signal pattern implicitly.

More specifically, the positions of edge reference signals and the number of occupied subcarriers may be described as a function of subband bandwidth W and the subband center frequency $f_c$:

$$f(W, f_c);$$

wherein $f(\cdot)$ denotes a function relationship.

In one embodiment, the notification of the number of the occupied subcarriers and the positions of edge reference signals may be implemented together or separately. Hereinafter, a separate notification is taken as an example to describe a method for determining the number of the occupied subcarriers and the positions of edge reference signals.

The number of subcarriers occupied by edge reference signals is determined by the subband bandwidth, which may be described as a following formula:

$$N_{edge} = N_{Ref} - N_{index}(W);$$

wherein $N_{Ref}$ denotes the number of subcarriers occupied by edge reference signals for a reference subband bandwidth and may be a nonnegative integer defined in advance. $N_{index}(W)$ denotes an offset of the number of subcarriers occupied by edge reference signals when the subband bandwidth is W compared with the reference subband bandwidth, also referred to as an adjustment value of the subband bandwidth W. Suppose that the number of subcarriers occupied by the edge reference signals when the reference subband bandwidth is 5 MHz is $N_{Ref}$, and $N_{Ref}=2$, the adjustment value may be as shown in the following table:

TABLE 2

A possible relationship between adjustment value and subband bandwidth

| | Subband bandwidth | | | | | |
|---|---|---|---|---|---|---|
| | 360 kHz | 540 kHz | 1.25 MHz | 5 MHz | 10 MHz | 20 MHz |
| Adjustment value | 2 | 1 | 1 | 0 | −1 | −2 |

It can be seen that, taking 5 MHz as the reference subband bandwidth, the larger the subband bandwidth, the fewer the subcarriers need to be occupied by the edge reference signals; and the smaller the subband bandwidth, the more the subcarriers need to be occupied by the edge reference signals.

The positions of the edge reference signals are relevant to the position of the subband, i.e. the edge reference signals of adjacent subbands should be transmitted in non-overlapping carrier symbols. The positions may be determined as follows:

a. determine an initial position of the edge reference signals of the UE (different subbands have the same initial position); specifically, the initial position of edge reference signals may be determined according to a manner similar as the CRS, CSI-RS or UE-specific RS of LTE-A, and b. calculate an offset $T_{edge}$ compared with the initial position according to the center frequency point of subband (the relative position of subband in the whole frequency band) the offset is 0 or 1.

Considering that services using different carrier modulation parameters usually adopt a frequency division multiplexing manner, the center frequency of respective subband is relatively fixed in a certain period of time. Therefore, the center frequency point $f_c$ may be replaced by the number of subbands $N_c$ counted from edge of the whole available frequency band, so as to determine the offset. The offset may be calculated according to a following formula:

$$T_{edge} = \text{mod}(N_c, 2),$$

where offset $T_{edge}$ may be determined through performing a modulo-2 operation to $N_c$.

In other words, the method for determining the number of subcarriers $N_{edge}$ occupied by the edge reference signals according to the received subband bandwidth includes: $N_{edge} = N_{Ref} - N_{index}(W)$; and/or, the determining the positions of the edge reference signals according to the received subband center frequency point includes determining the initial position of the edge reference signals of the UE, and calculating the offset of the positions of the reference signal compared to the initial position according to the center frequency point following $T_{edge} = \text{mod}(N_c, 2)$, wherein $N_c$ denotes the index of current subband counted from edge of system available frequency band.

The above are the embodiments of the signal transmitting and receiving methods in the filtering-based carrier modulation system. This disclosure also provides a transmitter and a receiver in the filtering-based carrier modulation system to implement the transmitting and receiving methods mentioned above.

Figure 21:
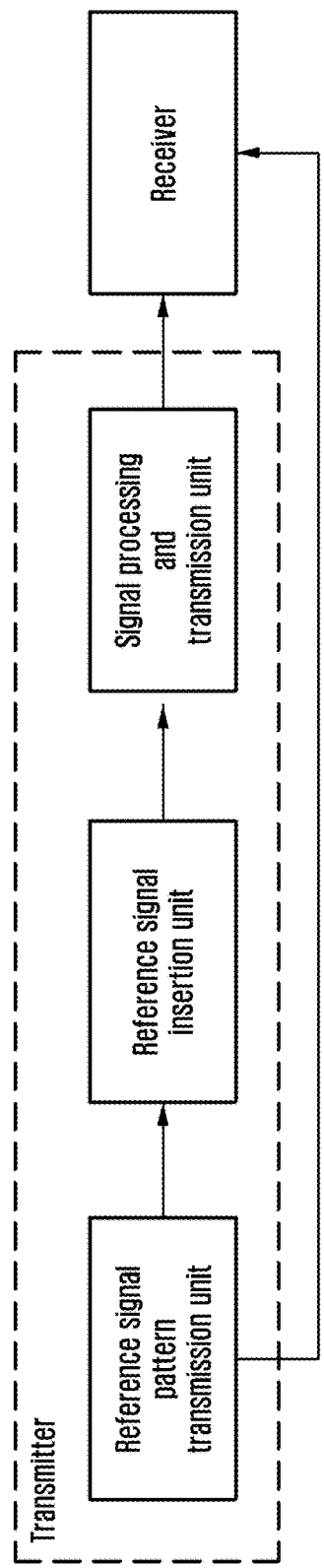
FIG. 21 is a schematic diagram illustrating a structure of a transmitter according to some embodiments of the present disclosure.

Specifically, a basic structure of the transmitter is as shown in FIG. 21 includes a reference signal pattern transmission unit, a reference signal insertion unit and a signal processing and transmission unit.

The reference signal pattern transmission unit is configured to determine a reference signal pattern for each subband of an available frequency band of a system, and transmitting reference signal pattern information to a receiver. The reference signal insertion unit is configured to insert reference signals on corresponding time-frequency resources according to the reference signal pattern of each subband, wherein the reference signals are used for estimating a frequency domain response of an equivalent channel consisting of a time domain filter and a physical channel from the transmitter to the receiver. The signal processing and transmission unit is configured to perform a carrier modulation and time domain filtering to data signals and the reference signals, and combining and transmitting a processed signal of each subband.

Figure 22:
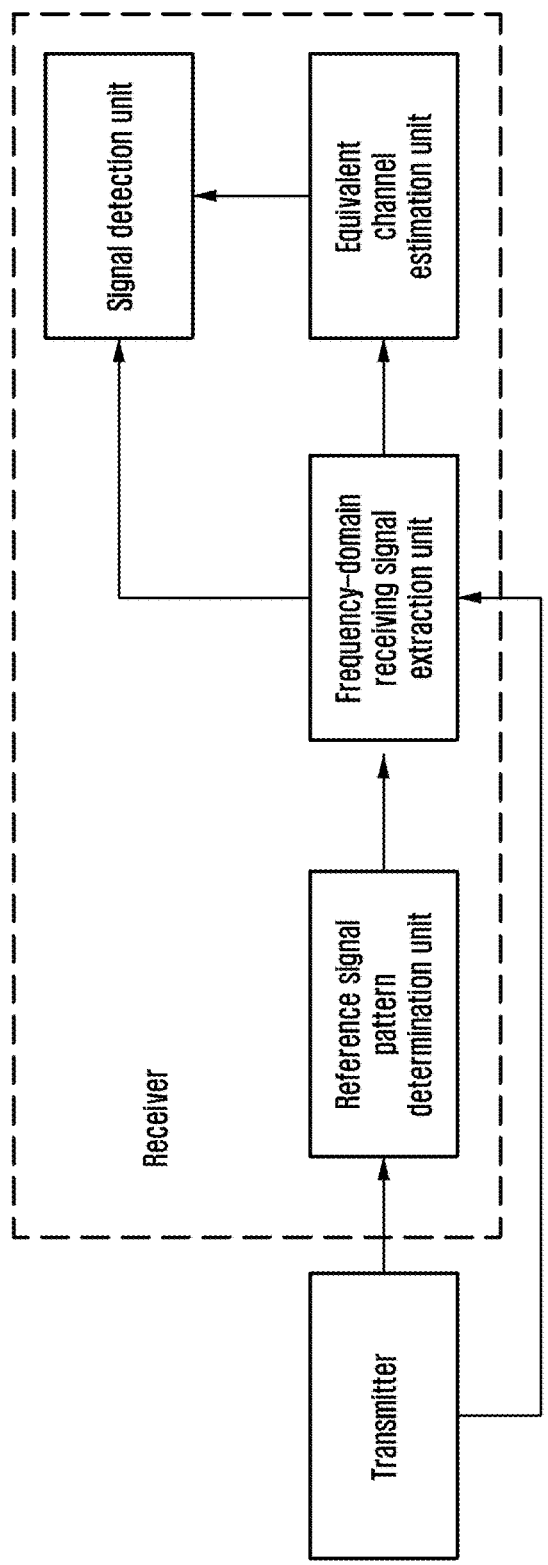
FIG. 22 is a schematic diagram illustrating a structure of a receiver according to some embodiments of the present disclosure.

A basic structure of the receiver is shown as FIG. 22, including: a reference signal pattern determination unit, a frequency domain receiving signal extraction unit, an equivalent channel estimation unit and a signal detecting unit.

The reference signal pattern determination unit is configured to receive, from a transmitter, reference signal pattern information corresponding to each subband of an available frequency band in a system, and determine a reference signal pattern. The frequency domain receiving signal extraction unit is configured to perform a carrier demodulation to a time domain receiving signal of each subband, and extract data signals and reference signals according to the reference signal pattern of each subband. The equivalent channel estimation unit is configured to estimate a frequency domain response of an equivalent channel consisting of a time domain filter and a physical channel from the transmitter to the receiver according to the reference signals. The signal detecting unit is configured to detect the data signals of each subband according to the frequency domain response of the equivalent channel of the subband.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal transmission method by a transmitter for a filtering-based carrier modulation system, the method comprising:
   determining a reference signal pattern for each subband included in a frequency band of a system based on a frequency domain response of a time domain filter for each subband;
   transmitting information on the determined reference signal pattern to a receiver;
   generating a signal including data signals and reference signals, the reference signals being inserted on corresponding time-frequency resources of the signal according to the determined reference signal pattern for each subband;
   processing the signal by performing a carrier modulation and time domain filtering to the data signals and the reference signals; and
   transmitting the processed signal of each subband,
   wherein a central region and at least one edge region included in each subband are determined based on the frequency domain response, and
   wherein a first reference signal pattern of the central region is different from a second reference signal pattern of the at least one edge region.

2. The method of claim 1, wherein:
   edge reference signals are inserted discontinuously or continuously on M consecutive subcarriers at the at least one edge region of each subband according to the second reference signal pattern,
   center reference signals are inserted discontinuously or continuously on subcarriers at the central region of each subband except for the M consecutive subcarriers according to the first reference signal pattern,
   wherein M is a natural number determined by a property of the time domain filter of each subband, and
   wherein a number of subcarriers between two adjacent edge reference signals is smaller than a carrier threshold.

3. The method of claim 2, wherein:
   the edge reference signals are not inserted by a same carrier modulated symbol in each of two adjacent subbands,
   the edge reference signals are carried by discontinuous carrier modulated symbols in a time domain,
   the center reference signals are carried by discontinuous carrier modulated symbols in the time domain, and
   the same carrier modulation and the time domain filtering as the data signals are performed to the edge reference signals and the center reference signals.

4. The method of claim 2, wherein:
   first edge reference signals of a first subband and second edge reference signals of a second subband are carried by adjacent carrier modulated symbols,
   subcarriers of the first subband, adjacent to a guard band corresponding to a carrier modulated symbol on which the second subband transmits the second edge reference signals are regarded as first guard subcarriers,
   subcarriers of the second subband, adjacent to the guard band, carried by a carrier modulated symbol on which the first subband transmits the first edge reference signals are regarded as second guard subcarriers,
   a number of the first and the second guard subcarriers is pre-defined according to a property of the time domain filter and a bandwidth of a subband, and
   the number of the first and the second guard subcarriers is the same as a number of subcarriers occupied by the first and the second edge reference signals.

5. The method of claim 2, wherein:
   edge reference signals of different data layers are transmitted by orthogonal resources, and center reference signals of different data layers are transmitted by orthogonal resources based on the transmitter being equipped with multiple transmission antennas,
   the orthogonal resources comprise orthogonal time resources, orthogonal frequency resources and orthogonal code sequences, and
   the transmitting of the information on the determined reference signal pattern further comprises:
   indicating a relationship between the reference signal pattern information and corresponding data layers.

6. The method of claim 2, further comprising:
   transmitting first edge reference signals and center reference signals of each data layer periodically,
   wherein the first edge reference signals of different data layers are transmitted by first orthogonal resources, and the center reference signals of different data layers are transmitted by second orthogonal resources, among the data layers,
   wherein one data layer is selected to transmit second edge reference signals, wherein the first and second orthogonal resources comprise orthogonal time resources, orthogonal frequency resources and orthogonal code sequences, and wherein transmitting the information on the determined reference signal pattern comprises:
transmitting pattern information of the first edge reference signals and the center reference signals corresponding to each data layer; and
indicating a relationship between the pattern information and a corresponding data layer.

7. The method of claim 2, wherein:
center reference signals and edge reference signals carried by a first carrier modulated symbol are used for estimating the frequency domain response of a corresponding channel,
center reference signals carried by a second carrier modulated symbol which does not carry the edge reference signals are used for estimating the frequency domain response of a physical channel between the transmitter and the receiver,
a plurality of consecutive subcarriers at the edge of each subband are not used for data transmission,
demodulation reference signals are carried by non-consecutive subcarriers in carrier modulated symbols except for the first carrier modulated symbol and the second carrier modulated symbol within an entire subband bandwidth to estimate the frequency domain response of
performing the carrier modulation for the reference signals carried by the second carrier modulated symbol is performed and time domain filtering for the reference signals carried by the second carrier modulated symbols is not performed,
the carrier modulation and time domain filtering are performed for other carrier modulated symbols, and
a number of subcarriers on which no data is transmitted is determined according to each subband bandwidth.

8. The method of claim 3, wherein:
the center reference signals carried by a first carrier modulated symbol carrying the edge reference signals are used for estimating the frequency domain response of an equivalent channel,
center reference signals carried by a second carrier modulated symbol which does not carry the edge reference signals are used for estimating the frequency domain response of a physical channel between the transmitter and the receiver,
a plurality of consecutive subcarriers at the edge region of the subband are not used for data transmission,
demodulation reference signals are carried by non-consecutive subcarriers in carrier modulated symbols except for the first carrier modulated symbol and the second carrier modulated symbol within an entire subband bandwidth to estimate the frequency domain response of a corresponding channel of the carrier modulated symbols,
the carrier modulation for the reference signals carried by the second carrier modulated symbol is performed and the time domain filtering for the reference signals carried by the second carrier modulated symbol is not performed,
the carrier modulation and time domain filtering for other carrier modulated symbols are performed, and
a number of subcarriers on which no data is transmitted is determined according to each subband bandwidth.

9. The method of claim 7, wherein:
the first carrier modulated symbol and the second carrier modulated symbol are transmitted on one data layer, based on the transmitter being equipped with multiple transmission antennas,
no data is transmitted on time-frequency resources of other data layers used for the first carrier modulated symbol and the second carrier modulated symbol,
the demodulation reference signals of different data layers are transmitted by orthogonal resources,
the orthogonal resources comprise orthogonal time resources, orthogonal frequency resources and orthogonal code sequences,
transmitting of the information on the determined reference signal pattern comprises:
transmitting pattern information of the first carrier modulated symbol and the second carrier modulated symbol, pattern information of the demodulation reference signals corresponding to each data layer, and a relationship between the pattern information of the demodulation reference signals and each data layer.

10. The method of claim 7, further comprising:
inserting the first carrier modulated symbol and the second carrier modulated symbol periodically according to the determined reference signal pattern; and
transmitting an insertion periodicity of the first carrier modulated symbol and second carrier modulated symbol to the receiver while transmitting the information on the determined reference signal pattern,
wherein the insertion periodicity is larger than a predefined threshold.

11. The method of claim 6, further comprising:
transmitting aperiodic reference signals to the receiver, based on receiving an aperiodic reference signal transmission request from the receiver, or determining that a current channel quality is lower than a predefined threshold,
wherein, after receiving the aperiodic reference signal transmission request, the aperiodic reference signals are transmitted after a preset time interval, and
wherein, before transmitting the aperiodic reference signals, an indication signal indicating transmission of aperiodic reference signals, is transmitted.

12. The method of claim 10, further comprising:
transmitting aperiodic reference signals to the receiver based on receiving an aperiodic reference signal transmission request from the receiver, or determining that a current channel quality is lower than a predefined threshold,
wherein, after receiving the aperiodic reference signal transmission request, the aperiodic reference signals are transmitted after a preset time interval, and
wherein, before transmitting the aperiodic reference signals, an indication signal indicating transmission of aperiodic reference signals, is transmitted.

13. The method of claim 2, wherein the transmitting of the information on the determined reference signal pattern to the receiver comprises:
transmitting each subband bandwidth as the information on the determined reference signal pattern to the receiver based on a unique reference signal pattern being configured to a corresponding subband bandwidth;
transmitting each subband bandwidth and index information of the determined reference signal pattern to the receiver, or, transmitting index information of the determined reference signal pattern to the receiver as the information on the determined reference signal pattern, or, transmitting positions of time-frequency resources of the reference signals in the determined reference signal pattern to the receiver as the information on the determined reference signal pattern based on two or more reference signal patterns being configured to the corresponding subband bandwidth; and transmitting each subband bandwidth and a center frequency point of each subband to the receiver as the information on the determined reference signal pattern based on the edge reference signals of two adjacent subbands being not carried by a same carrier modulated symbol.

14. The method of claim 3, wherein the transmitting of the information on the determined reference signal pattern to the receiver comprises:

transmitting each subband bandwidth as the information on the determined reference signal pattern to the receiver based on a unique reference signal pattern being configured to a corresponding subband bandwidth;

transmitting each subband bandwidth and index information of the determined reference signal pattern to the receiver, or, transmitting index information of the determined reference signal pattern to the receiver as the information on the determined reference signal pattern, or transmitting positions of time-frequency resources of the reference signals in the determined reference signal pattern to the receiver as the information on the determined reference signal pattern based on two or more reference signal patterns being configured to a corresponding subband bandwidth; and transmitting each subband bandwidth and a center frequency point of each subband to the receiver as the information on the determined reference signal pattern based on the edge reference signals of two adjacent subbands being not carried by a same carrier modulated symbol.

15. The method of claim 4, wherein the transmitting of the information on the determined reference signal pattern to the receiver comprises:

transmitting each subband bandwidth as the information on the determined reference signal pattern to the receiver based on a unique reference signal pattern being configured to the corresponding subband bandwidth;

transmitting each subband bandwidth and index information of the determined reference signal pattern to the receiver, or, transmitting index information of the determined reference signal pattern to the receiver as the information on the determined reference signal pattern, or transmitting positions of time-frequency resources of the reference signals in the determined reference signal pattern to the receiver as the information on the determined reference signal pattern based on two or more reference signal patterns being configured to the corresponding subband bandwidth; and transmitting each subband bandwidth and a center frequency point of each subband to the receiver as the information on the determined reference signal pattern based on the edge reference signals of two adjacent subbands being not carried by a same carrier modulated symbol.

16. A signal receiving method by a receiver for a filtering-based carrier modulation system, the method comprising:

receiving information on a reference signal pattern for each subband included in a frequency band of a system from a transmitter, the reference signal pattern for each subband being determined based on a frequency domain response of a time domain filter for each subband;

receiving a time domain signal including data signals and reference signals, the reference signals being inserted on corresponding time-frequency resources of the signal according to the reference signal pattern for each subband;

performing a carrier demodulation to the time domain signal for each subband;

extracting the data signals and the reference signals according to the reference signal pattern for each subband;

estimating the frequency domain response of the a time domain filter according to the reference signals; and detecting the data signals for each subband according to the frequency domain response of a corresponding channel of each subband, wherein a central region and at least one edge region included in each subband are determined based on the frequency domain response, and wherein a first reference signal pattern of the central region is different from a second reference signal pattern of the at least one edge region.

17. The method of claim 16, further comprising identifying the reference signal pattern for each subband.

18. The method of claim 17, wherein identifying the reference signal pattern for each subband comprises:

determining the reference signal pattern according to each subband bandwidth based on a unique reference signal pattern being configured to a corresponding subband bandwidth and the information on the reference signal pattern is determined for each subband bandwidth;

determining the reference signal pattern among two or more reference signal patterns corresponding to each subband bandwidth according to index information of the reference signal pattern based on two or more reference signal patterns being configured to a corresponding subband bandwidth, and the information on the reference signal pattern comprising each subband bandwidth and index information of the reference signal pattern; and determining a number of subcarriers occupied by edge reference signals according to each subband bandwidth, and determining positions of the edge reference signals according to a subband center frequency point.

19. A transmitter in filtering-based carrier modulation system, comprising:

a transceiver; and a controller configured to:

determine a reference signal pattern for each subband included in a frequency band of a system based on a frequency domain response of a time domain filter for each subband, control the transceiver to transmit information on the determined reference signal pattern to a receiver, generate a signal including data signals and reference signals, the reference signals being inserted on corresponding time-frequency resources of the signal according to the determined reference signal pattern for each subband, and process the signal by performing a carrier modulation and time domain filtering to the data signals and the reference signals, and control the transceiver to transmit the processed signal of each subband, wherein a central region and at least one edge region included in each subband are determined based on the frequency domain response, and wherein a first reference signal pattern of the central region is different from a second reference signal pattern of the at least one edge region.

20. A receiver in filtering-based carrier modulation system, comprising:

a transceiver; and a controller configured to:

receive, from a transmitter, information on a reference signal pattern for each subband included in a frequency band of a system, the reference signal pattern for each subband being determined based on a frequency domain response of a time domain filter for each subband, control the transceiver to receive a time domain signal including data signals and reference signals, the reference signals being inserted on corresponding time-frequency resources of the signal according to the reference signal pattern for each subband, perform a carrier demodulation to the time domain signal for each subband, extract the data signals and the reference signals according to the reference signal pattern for each subband, estimate the frequency domain response of the time domain filter according to the reference signals, and detect the data signals for each subband according to the frequency domain response of a corresponding channel of each subband, wherein a central region and at least one edge region included in each subband are determined based on the frequency domain response, and wherein a first reference signal pattern of the central region is different from a second reference signal pattern of the at least one edge region.

* * * * *